US011632379B2

(12) United States Patent
Howard et al.

(10) Patent No.: US 11,632,379 B2
(45) Date of Patent: *Apr. 18, 2023

(54) METHOD AND SYSTEM FOR DETECTING RESTRICTED CONTENT ASSOCIATED WITH RETRIEVED CONTENT

(71) Applicant: Sophos Limited, Abingdon (GB)

(72) Inventors: Fraser Howard, Finstock (GB); Paul Oliver Baccas, Oxford (GB); Vanja Svajcer, Oxford (GB); Benjamin John Godwood, Chipping Norton (GB); William James McCourt, Oxfordshire (GB)

(73) Assignee: Sophos Limited, Abingdon (GB)

( * ) Notice: Subject to any disclaimer, the term of this patent is extended or adjusted under 35 U.S.C. 154(b) by 179 days.

This patent is subject to a terminal disclaimer.

(21) Appl. No.: 15/943,014

(22) Filed: Apr. 2, 2018

(65) Prior Publication Data

US 2018/0227319 A1 Aug. 9, 2018

Related U.S. Application Data

(63) Continuation of application No. 15/691,875, filed on Aug. 31, 2017, now Pat. No. 9,967,271, which is a
(Continued)

(51) Int. Cl.
*H04L 29/06* (2006.01)
*H04L 9/40* (2022.01)
*G06F 21/56* (2013.01)

(52) U.S. Cl.
CPC ........ *H04L 63/1416* (2013.01); *G06F 21/567* (2013.01); *H04L 63/102* (2013.01);
(Continued)

(58) Field of Classification Search
CPC ... H04L 63/1416; H04L 63/102; H04L 63/12; H04L 63/1433; H04L 63/1441;
(Continued)

(56) References Cited

U.S. PATENT DOCUMENTS 6,654,751 B1 11/2003 Schmugar et al.
6,882,999 B2 4/2005 Cohen et al.
(Continued)

FOREIGN PATENT DOCUMENTS

JP 2006221242 A * 8/2006 ......... H04L 63/1441
WO WO-06119479 A2 11/2006

OTHER PUBLICATIONS

""pharming"", In The Penguin English Dictionary. Retrieved from http://www.credoreference.com/entry/penguineng/pharming on Jul. 15, 2011 Jul. 15, 2011 , 1 page.
(Continued)

*Primary Examiner* — Joseph P Hirl
*Assistant Examiner* — Chi D Nguy
(74) *Attorney, Agent, or Firm* — Strategic Patents, P.C.

(57) ABSTRACT

In embodiments of the present invention improved capabilities are described for detecting restricted content associated with retrieved content. The method and system may include receiving a client request for content, saving contextual information from the client request, presenting retrieved content in response to the client request, and presenting the contextual information from the client request, and retrieved content, to a scanning facility. The scanning facility may utilize the contextual information from the client request to aid in the detection of restricted content associated with retrieved content.

20 Claims, 7 Drawing Sheets

Related U.S. Application Data continuation of application No. 15/429,755, filed on Feb. 10, 2017, now Pat. No. 9,800,599, which is a continuation of application No. 15/176,202, filed on Jun. 8, 2016, now Pat. No. 9,654,488, and a continuation of application No. 15/176,291, filed on Jun. 8, 2016, now Pat. No. 9,609,008, said application No. 15/176,202 is a continuation of application No. 14/838,973, filed on Aug. 28, 2015, now Pat. No. 9,386,032, said application No. 15/176,291 is a continuation of application No. 14/838,973, filed on Aug. 28, 2015, now Pat. No. 9,386,032, which is a continuation of application No. 14/168,321, filed on Jan. 30, 2014, now Pat. No. 9,122,874, which is a continuation of application No. 12/055,586, filed on Mar. 26, 2008, now Pat. No. 8,650,648.

(52) U.S. Cl.
CPC ............ *H04L 63/12* (2013.01); *H04L 63/145* (2013.01); *H04L 63/1433* (2013.01); *H04L 63/1441* (2013.01); *H04L 63/20* (2013.01); *G06F 2221/034* (2013.01); *G06F 2221/2115* (2013.01)

(58) Field of Classification Search
CPC ..... H04L 63/145; H04L 63/20; G06F 21/567; G06F 2221/034; G06F 2221/2115
See application file for complete search history.

(56) References Cited

U.S. PATENT DOCUMENTS

| | | | |
|---|---|---|---|
| 6,988,209 B1 | 1/2006 | Balasubramaniam et al. | |
| 7,058,978 B2 | 6/2006 | Feuerstein et al. | |
| 7,117,227 B2 | 10/2006 | Call et al. | |
| 7,209,954 B1 | 4/2007 | Rothwell et al. | |
| 7,287,279 B2 | 10/2007 | Bertman et al. | |
| 7,590,707 B2 | 9/2009 | McCloy, III et al. | |
| 7,792,994 B1* | 9/2010 | Hernacki ................ | H04L 12/66 709/229 |
| 7,984,500 B1* | 7/2011 | Khanna ............... | H04L 63/1483 709/225 |
| 8,181,244 B2 | 5/2012 | Boney | |
| 8,201,243 B2 | 6/2012 | Boney | |
| 8,418,250 B2 | 4/2013 | Morris et al. | |
| 8,566,589 B1* | 10/2013 | Satish ..................... | H04L 67/02 713/168 |
| 8,719,932 B2 | 5/2014 | Boney | |
| 8,726,389 B2 | 5/2014 | Morris et al. | |
| 8,763,123 B2 | 6/2014 | Morris et al. | |
| 8,826,434 B2 | 9/2014 | Merza | |
| 8,856,505 B2 | 10/2014 | Schneider | |
| 9,173,801 B2 | 11/2015 | Merza | |
| 9,413,721 B2 | 8/2016 | Morris et al. | |
| 9,578,045 B2 | 2/2017 | Jaroch et al. | |
| 10,257,224 B2 | 4/2019 | Jaroch et al. | |
| 2002/0083341 A1 | 6/2002 | Feuerstein et al. | |
| 2002/0112185 A1 | 8/2002 | Hodges | |
| 2002/0013371 A1 | 9/2002 | Tarbotton et al. | |
| 2002/0199116 A1 | 12/2002 | Hoene et al. | |
| 2003/0023866 A1 | 1/2003 | Hinchliffe et al. | |
| 2005/0022018 A1* | 1/2005 | Szor .................... | H04L 63/1416 726/4 |
| 2005/0188423 A1 | 8/2005 | Motsinger et al. | |
| 2005/0283836 A1 | 12/2005 | Lalonde et al. | |
| 2006/0080735 A1 | 4/2006 | Brinson et al. | |
| 2006/0123464 A1 | 6/2006 | Goodman et al. | |
| 2006/0174344 A1 | 8/2006 | Costea et al. | |
| 2007/0143851 A1 | 6/2007 | Nicodemus et al. | |
| 2007/0192865 A1 | 8/2007 | Mackin | |
| 2008/0034425 A1 | 2/2008 | Overcash et al. | |
| 2008/0133540 A1* | 6/2008 | Hubbard ............. | H04L 63/1483 |
| 2009/0064335 A1* | 3/2009 | Sinn ...................... | G06F 21/561 726/24 |
| 2009/0249482 A1* | 10/2009 | Sarathy ................. | H04L 63/102 726/22 |
| 2009/0249484 A1 | 10/2009 | Howard et al. | |
| 2011/0302653 A1 | 12/2011 | Frantz et al. | |
| 2013/0097699 A1 | 4/2013 | Balupari et al. | |
| 2013/0342538 A1 | 12/2013 | Kozine et al. | |
| 2014/0215622 A1 | 7/2014 | Howard et al. | |
| 2015/0373037 A1 | 12/2015 | Howard et al. | |
| 2016/0359883 A1 | 12/2016 | Howard et al. | |
| 2016/0373469 A1 | 12/2016 | Howard et al. | |
| 2017/0208078 A1 | 7/2017 | Howard et al. | |
| 2017/0366565 A1 | 12/2017 | Howard | |

OTHER PUBLICATIONS

"U.S. Appl. No. 14/838,973 Notice of Allowance dated Apr. 1, 2016", 18 Pages.
"U.S. Appl. No. 15/176,291 Non-Final Office Action dated Nov. 2, 2016", 11 pages.
"U.S. Appl. No. 15/691,875 Notice of Allowance dated Feb. 2, 2018", 10 pages.
"U.S. Appl. No. 15/691,875 Non-Final Office Action dated Dec. 5, 2017", 22 pages.
"U.S. Appl. No. 12/055,586, Non-Final Office Action dated Mar. 21, 2011", 16 pages.
"U.S. Appl. No. 12/055,586, Notice of Allowance dated Oct. 7, 2013", 13 pages.
"U.S. Appl. No. 14/168,321, Non-Final Office Action dated Mar. 5, 2015", 19 pages.
"U.S. Appl. No. 14/168,321, Notice of Allownace dated Jun. 24, 2015", 15 pages.
"U.S. Appl. No. 14/838,973, Non-Final Office Action dated Nov. 27, 2015", 7 pages.
"U.S. Appl. No. 15/176,202, Notice of Allowance dated Feb. 22, 2017", 12 pages.
"U.S. Appl. No. 15/429,755, Non-Final Office Action dated Jul. 31, 2017", 19 pages.
"U.S. Appl. No. 15/429,755, Notice of Allowance dated Aug. 25, 2017", 10 pages.
"U.S. Appl. No. 12/055,586, Final Office Action dated Aug. 5, 2011", 15 pages.
"U.S. Appl. No. 15/176,202, Non-Final Office Action dated Nov. 30, 2016", 17 pages.
"U.S. Appl. No. 15/176,291, Notice of Allowance dated Jan. 20, 2017", 17 pages.
Allen, et al., "Challenges in Information Retrieval and Language Modeling", ACM SIGIR Forum, 2003, 17 pages.
Finkelstein, et al., "Placing Search in Context: The Concept Revisited", Zapper Technologies, Inc.; ACM Transactions on Information Systems, vol. 20, No. 1, Jan. 2002, pp. 116-131, 16 pages.

* cited by examiner

METHOD AND SYSTEM FOR DETECTING RESTRICTED CONTENT ASSOCIATED WITH RETRIEVED CONTENT

CROSS-REFERENCE TO RELATED APPLICATIONS

This application is a continuation of U.S. patent application Ser. No. 15/691,875 filed on Aug. 31, 2017, which is a continuation of U.S. patent application Ser. No. 15/429,755 filed Feb. 10, 2017 (now U.S. Pat. No. 9,800,599), which is a continuation of U.S. patent application Ser. No. 15/176,202 filed Jun. 8, 2016 (now U.S. Pat. No. 9,654,488) and U.S. patent application Ser. No. 15/176,291 filed Jun. 8, 2016 (now U.S. Pat. No. 9,609,008), which are each continuations of U.S. patent application Ser. No. 14/838,973 filed Aug. 28, 2015 (now U.S. Pat. No. 9,386,032), which is a continuation of U.S. patent application Ser. No. 14/168,321 filed Jan. 30, 2014 (now U.S. Pat. No. 9,122,874), which is a continuation of U.S. patent application Ser. No. 12/055,586 filed Mar. 26, 2008 (now U.S. Pat. No. 8,650,648), each of which is hereby incorporated by reference in its entirety.

BACKGROUND

Field

The present invention is related to secure computing, and more specifically related to contextual scanning of data for detecting restricted content.

Description of the Related Art

One aspect of secure computing is the scanning of data as it is received from a source, such as for the scanning for malware, confidential materials, restricted materials, and the like. Malware may be defined as malicious software that may infiltrate a computer system with the intention of damaging it. Examples of malware may be computer viruses, computer worms, spyware, adware or any other unwanted software. Current techniques for the scanning of data may provide for the blocking of known source sites, such as through the use of Uniform Resource Identifier (URI) black lists and such, but individuals bent on circumventing blacklists often change their URIs constantly, even breaking the delivery of their content into a series of deliverables, each with their own URI. There exists therefore a need for improved methods of scanning data that better utilize information associated with the client request and the retrieved content.

SUMMARY

In embodiments, identifying content through a scanning facility may be done for a number of reasons. One reason may be the potential for unintentionally receiving malware, and the need to block the malware upon reception before the malware has the chance to do any damage. Traditionally, one way malware may be identified is with identity files utilized by the scanning facility. However, the chances of identifying the malware may be greatly increased if the scanning facility is able to scan the received content in light of some information associated with the file, the address, the URI, the source, the sender, and the like. Similarly, this technique may be used against file transfers that are potentially less malicious, such unauthorized transfers, downloading or uploading confidential files from within or outside an enterprise, the downloading or transfer of inappropriate content, and the like. The present invention may allow for a technique, where the content being retrieved, and information associated with the request or source of the information, may both be made available to the scanning facility to increase the potential for targeted content to be identified.

In embodiments, the present invention may provide for an improved method and system to detect restricted content associated with retrieved content. The method and system may include receiving a client request for content, saving contextual information from the client request, presenting retrieved content in response to the client request, presenting the contextual information from the client request and retrieved content to a scanning facility, and the like. The scanning facility may utilize the contextual information from the client request to aid in the detection of restricted content associated with the retrieved content.

In embodiments, the contextual information may be extracted from a URI included in the client request, where the extracted information may be a plurality of characters from the URI, may exclude the domain name, may include address information irrespective of the domain name, may be a data pattern determined based on a study of how a malicious attacker is changing the URI, and the like. In embodiments, the contextual information may be derived from a URI included in the client request, where data pattern information may be extracted from the URI and compared to data patterns of target content to derive the contextual information. In embodiments, the scanning facility may be a local to the client, a server based scanning facility, and the like. A client request restriction process may be provided in association with a policy facility such that certain client requests are automatically denied. In addition, a remedial action may be performed on the client in response to the scanning facility blocking of restricted content, where the remedial action may be a scan of a local drive for malicious software.

In embodiments, the client request may be associated with one or more IP addresses, one or more servers, and the like. The server may be an enterprise server, a root name server or any other server. The enterprise server may be under the control of an administrator.

In embodiments, the client request may be an address. The address may be a web address, an origin address, a destination address, an email address, a network address, and the like. The address may be associated with a device ID, a digital certificate and the like.

In embodiments, the client request may be a URI. The URI may be a uniform resource locator (URL). The URI may include a domain name. The domain name may be a registered domain name, a top-level domain name and the like. The domain name may be associated with voice over Internet protocol (VoIP), domain keys, an email and the like. The top-level domain name may be associated with a country.

In embodiments, the URI may include a sub-domain name. The sub-domain name may be associated with a server. In another embodiment, the URI may include a host name.

In embodiments, the URI may be associated with multiple domain names. In another embodiment, the URI may be associated with URI redirection.

In embodiments, the client request may be associated with a location. The location may be a geographic location, a business location, a residence location, a government location, a public location, a private location, a network location, a server location, a district, a region, a vicinity, and the like.

In embodiments, the contextual information may be associated with a character string within the client request. The character may be an alphanumeric character, an alphanumeric code character, an ascii character, and the like.

In embodiments, the contextual information may be associated with a portion of a character string within a one or more client requests. The one or more client requests may be in a sequence. The portion of the character string may be changing from a first client request to a second client request. The changing may be a changing numerical sequence, a changing of an alphanumeric sequence, a changing of an alphanumeric code sequence, a changing that increases the value of the portion of the character string, a changing that decreases the value of the portion of the character string, a changing that may be associated with a pattern of changing.

In embodiments, the contextual information may be associated with a portion of a character string within a one or more client requests. The portion may be an unchanged portion from a first client request to a second client request. The unchanged portion may be associated with malware detection.

In embodiments, the portion of the character string may be compared to a library of previously stored portions. The previously stored portions may be an unchanging portion, a changing portion.

In embodiments, the portion of the character string may be associated with the path taken by the client request. The path may be a relative path, an absolute path, and the like.

In embodiments, the portion of the character string may be associated with the domain of the client request. The portion of the character string may change while the domain name stays unchanged. The portion of the character string may be associated with the path.

In embodiments, the contextual information may be associated with a download, a detected pattern in a sequence of URI requests, and the like.

In embodiments, the contextual information may be associated with path information of the client request. The path information may include one or more sub-path portions from the origin of the client request to the location of the retrieved content.

In embodiments, the contextual information may be associated with path information of the retrieved content. The path information may include one or more sub-path portions from the location of the retrieved content to the origin of the client request.

In embodiments, the contextual information may be associated with information received along with the retrieved content. The information may be header information, path information, location information, domain information, IP address information, network information or any other information.

In embodiments, the retrieved content may be web content. The web content may be a text content, a document, a data file, a visual content, an aural content, an application, an e-service, a web page, a blog, a search result, a discussion board, an e-commerce site, a social network site, a download, a game, an email, an appropriate website, an inappropriate website and the like. The visual content may be an image, a video, an animation, and the like.

In embodiments, the retrieved content may be associated with malware. The malware may be content associated with spam, content associated with a virus, content associated with a worm, content associated with a Trojan horse, content associated with spyware, content associated with adware, and the like.

In embodiments, the retrieved content may be confidential content. The confidential content may be company confidential, government confidential or any other confidential content.

In embodiments, the retrieved content may be offensive content. The offensive content may be personally offensive, professionally offensive, sexually offensive or offensive in any manner.

In embodiments, the client request restriction may be associated with the contextual information from the client request. The contextual information may include an alphanumeric pattern associated with malware, a domain name pattern associated with malware and the like. The alphanumeric pattern may be a known alphanumeric string within the client request, a sequence of alphanumeric strings in a series of client requests. The domain name pattern may be associated with a series of client requests.

In embodiments, the client request restriction may be associated with a characteristic of the retrieved content. The characteristic may be associated with an email message characteristic, an email header, a mailing list, a language characteristic. The language characteristic may be associated with a phrase. The phrase may be a slang. The language characteristic may be associated with one or more words and phrases in proximity to one another.

In embodiments, the client request restriction may be associated with a type of retrieved content. The type may be a webpage, a document, a multimedia file and the like. The multimedia file may be a video file, an audio file, an animation file, an advertisement and the like. The type may be an attachment, a download, an email, and the like.

In embodiments, the client request restriction may be associated with the source of the content. The source of the content may be the source of the downloaded content, a local machine and the like. The local machine may be the machine that created the content, copied the content or sourced the content in any other manner. In an embodiment, the source of the content may be from outside an enterprise. In another embodiment, the source of the content is from inside an enterprise.

In embodiments, the restricted content may be associated with application classification. The application classification may be malware, work product, personal, unapproved, restricted, allowed.

In embodiments, the restricted content may be confidential content. The confidential content may be company confidential, government confidential or any other type of confidential content.

In embodiments, the restricted content may be offensive content. The offensive content may be personally offensive, professionally offensive, sexually offensive, and the like.

In embodiments, the contextual information may allow the scanning facility to determine the reputation of the content. The reputation of the content may be associated with the source of the content, the author of the content and the like. The author of the content may be associated with an enterprise, a location and the like. The reputation of the content may be associated with time. The time may be the time the content is created, the time the content is downloaded, the time the content is copied, the time the content is requested or any other time.

In embodiments, the present invention may provide an improved method and system to detect malware associated with the retrieved content. The method and system may include a presenting a client request for content, saving contextual information from the client request, presenting retrieved content associated with the client request, providing a client request restriction in association with a policy facility and presenting the contextual information from the client request, and retrieved content, to a malware detection facility. The malware detection facility may utilize the contextual information from the client request to aid in the detection of malware associated with the retrieved content.

In embodiments, the present invention may provide an improved method and system to detect restricted content associated with an electronic file. The method and system may include presenting an electronic file on a computing facility, extracting locale information from the electronic file, providing locale restrictions in association with a policy facility and presenting the locale information and the electronic file to a scanning facility. The scanning facility may utilize the locale information to aid in the detection of restricted content associated with the electronic file.

In embodiments, the locale restrictions may be associated with the location of the computing facility.

In embodiments, the restricted content may be associated with application classification. The application classification may be malware, work product, personal, unapproved, restricted, allowed, and the like.

In embodiments, the restricted content may be confidential content. The confidential content may be company confidential, government confidential or any other type of confidential content.

In embodiments, the restricted content may be offensive content. The offensive content may be personally offensive, professionally offensive, sexually offensive, and the like.

In embodiments, the locale information may allow the scanning facility to determine the reputation of the content. The reputation of the content may be associated with the source of the content, the author of the content and the like. The author of the content may be associated with an enterprise, a location and the like. The reputation of the content may be associated with time. The time may be the time the content is created, the time the content is downloaded, the time the content is copied, the time the content is requested or any other time.

In embodiments, the locale information may be associated with a location. The location may be a geographic location, a business location, a residence location, a government location, a public location, a private location, a network location, a server location, a district, a region, a vicinity, and the like.

In embodiments, the locale information may be associated with a domain name, a path, a file name, file header information, a current location, a previous location, a user location or any other location within or outside an enterprise network.

In embodiments, the electronic file may be retrieved from a file system, a network or any other computer system. The file may be retrieved by downloading.

In embodiments, the electronic file may be a word processing document, a spread sheet document, an image file, an audio file, an email, an application file, a web page, a web content page, a database file, a source code file, an operating system file, and the like.

In embodiments, the present invention may provide an improved method and system to detect malware associated with an electronic file. The method and system may include presenting an electronic file on a computing facility, extracting locale information from the electronic file, providing locale restrictions in association with a policy facility and presenting the locale information and the electronic file to a malware detection facility. The malware detection facility may utilize the locale information to aid in the detection of malware associated with the electronic file.

These and other systems, methods, objects, features, and advantages of the present invention will be apparent to those skilled in the art from the following detailed description of the preferred embodiment and the drawings. All documents mentioned herein are hereby incorporated in their entirety by reference.

BRIEF DESCRIPTION OF THE FIGURES

The invention and the following detailed description of certain embodiments thereof may be understood by reference to the following figures:

While the invention has been described in connection with certain preferred embodiments, other embodiments would be understood by one of ordinary skill in the art and are encompassed herein All documents referenced herein are hereby incorporated by reference DETAILED DESCRIPTION FIG. 1 depicts a block diagram of a threat management facility providing protection to an enterprise against a plurality of threats. An aspect of the present invention relates to corporate policy management and their implementation through a unified threat management facility 100. As will be explained in more detail below, a threat management facility 100 is used to protect computer assets from many threats, both computer generated threats and user generated threats. The threat management facility 100 is multi-dimensional in that it is designed to protect corporate assets from a variety of threats and it is adapted to learn about threats in one dimension (e.g. worm detection) and apply the knowledge in another dimension (e.g. spam detection). Corporate policy management is one of the dimensions for which the threat management facility can control. The corporation may institute a policy that prevents certain people (e.g. employees, groups of employees, types of employees, guest of the corporation, etc.) from accessing certain types of computer programs. For example, the corporation may elect to prevent its accounting department from using a particular version of an instant messaging service or all such services. In this example, the policy management facility 112 may be used to update the policies of all corporate computing assets with a proper policy control facility or it may update a select few. By using the threat management facility 100 to facilitate the setting, updating and control of such policies the corporation only needs to be concerned with keeping the threat management facility 100 up to date on such policies. The threat management facility 100 can take care of updating all of the other corporate computing assets.

Figure 1:
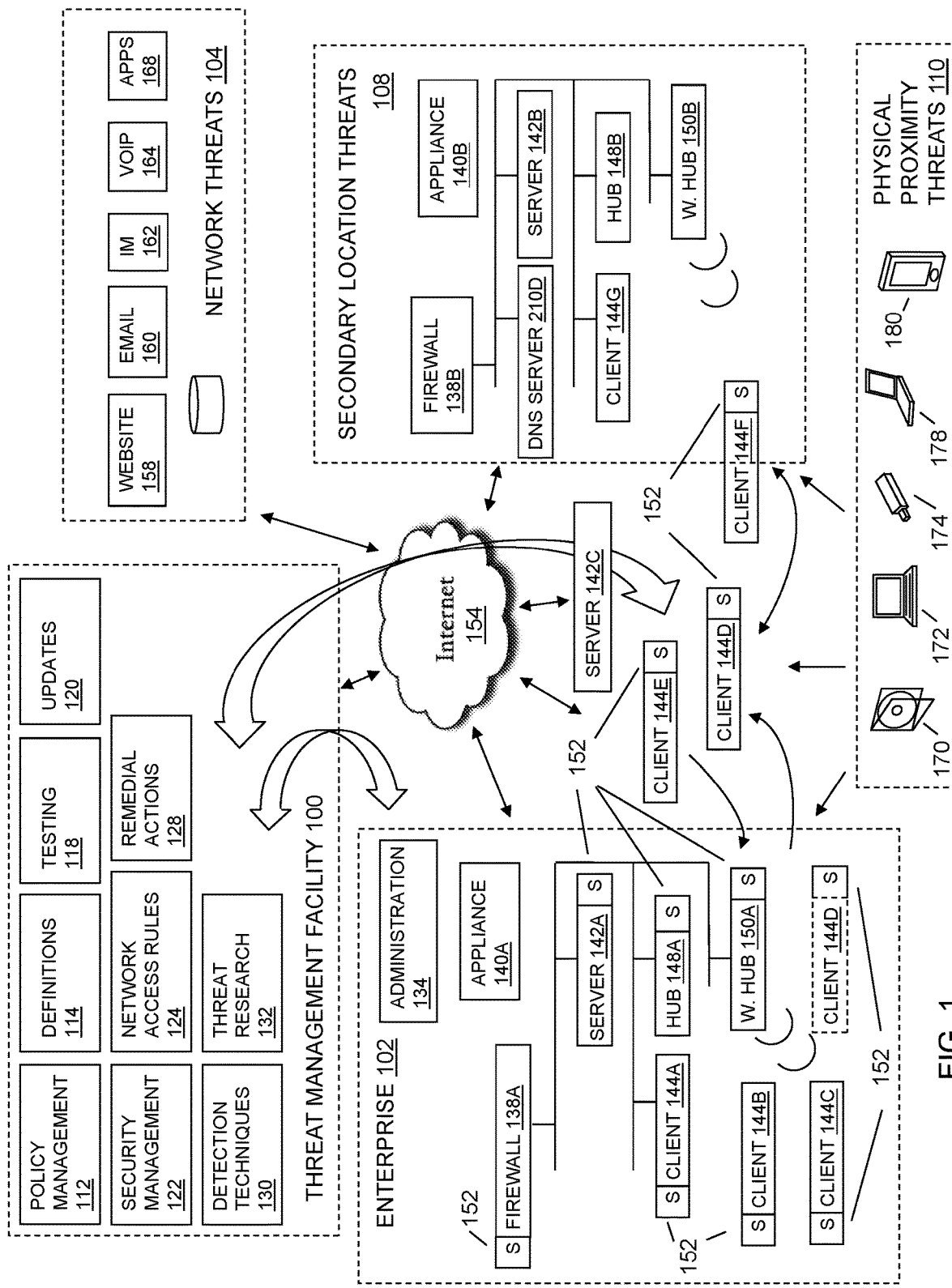
FIG. 1 depicts a block diagram of a threat management facility providing protection to an enterprise against a plurality of threats.

It should be understood that the threat management facility 100 may provide multiple services and policy management may be offered as one of the services. We will now turn to a description of the threat management system 100

Over recent years, malware has become a major problem across the internet 154. From both technical and user perspectives the categorization of a specific threat type, such as whether it is a virus, worm, spam, phishing exploration, spyware, adware, or the like, is becoming reduced in significance. The threat, no matter how it's categorized, may need to be stopped at all points of the enterprise facility 102, including laptop, desktop, server facility 142, gateway, and the like. Similarly, there may be less and less benefit to the user in having different solutions for known and unknown threats. As such, a consolidated threat management facility 100 may need to be applied to the same set of technologies and capabilities for all threats. The threat management facility 100 may provide a single agent on the desktop, and a single scan of any suspect file. This approach may eliminate the inevitable overlaps and gaps in protection caused by treating viruses and spyware as separate problems, while simultaneously simplifying administration and minimizing desktop load. As the number and range of types of threats has increased, so may have the level of connectivity available to all IT users. This may have lead to a rapid increase in the speed at which threats may move. Today, an unprotected PC connected to the internet 154 may be infected quickly, say within 10 minutes, which may require acceleration for the delivery of threat protection. Where once, monthly updates may have been sufficient, the threat management facility 100 may automatically and seamlessly update its product set against spam and virus threats quickly, for instance, every five minutes, every minute, continuously, or the like. Analysis and testing may be increasingly automated, and also may be performed more frequently; for instance, it may be completed in 15 minutes, and may do so without compromising quality. The threat management facility 100 may also extend techniques that may have been developed for virus and malware protection, and provide them to enterprise facility 102 network administrators to better control their environments. In addition to stopping malicious code, the threat management facility 100 may provide policy management that may be able to control legitimate applications, such as VoIP, instant messaging, peer-to-peer file-sharing, and the like, that may undermine productivity and network performance within the enterprise facility 102.

The threat management facility 100 may provide an enterprise facility 102 protection from computer-based malware, including viruses, spyware, adware, Trojans, intrusion, spam, policy abuse, uncontrolled access, and the like, where the enterprise facility 102 may be any entity with a networked computer-based infrastructure. In an embodiment, FIG. 1 may depict a block diagram of the threat management facility providing protection to an enterprise against a plurality of threats. The enterprise facility 102 may be corporate, commercial, educational, governmental, or the like, and the enterprise facility's 102 computer network may be distributed amongst a plurality of facilities, and in a plurality of geographical locations. The threat management facility 100 may include a plurality of functions, such as security management facility 122, policy management facility 112, update facility 120, definitions facility 114, network access rules facility 124, remedial action facility 128, detection techniques facility 130, testing facility 118, threat research facility 132, and the like. In embodiments, the threat protection provided by the threat management facility 100 may extend beyond the network boundaries of the enterprise facility 102 to include enterprise facility 102 client facility's 144 that have moved into network connectivity not directly associated or controlled by the enterprise facility 102. Threats to enterprise facility 102 client facilities 144 may come from a plurality of sources, such as from network threats 104, physical proximity threats 110, secondary location threats 108, and the like. In embodiments, the threat management facility 100 may provide an enterprise facility 102 protection from a plurality of threats to multiplatform computer resources in a plurality of locations and network configurations, with an integrated system approach.

In embodiments, the threat management facility 100 may be provided as a stand-alone solution. In other embodiments, the threat management facility 100 may be integrated into a third-party product. An application programming interface (e.g. a source code interface) may be provided such that the threat management facility 100 may be integrated. For instance, the threat management facility 100 may be stand-alone in that it provides direct threat protection to an enterprise or computer resource, where protection is subscribed to directly with the threat management facility 100. Alternatively, the threat management facility may offer protection indirectly, through a third-party product, where an enterprise may subscribe to services through the third-party product, and threat protection to the enterprise may be provided by the threat management facility 100 through the third-party product.

The security management facility 122 may include a plurality of elements that provide protection from malware to enterprise facility 102 computer resources, including endpoint security and control, email security and control, web security and control, control of unauthorized users, control of guest and non-compliant computers, and the like. The security management facility 122 may be a software application that may provide malicious code and malicious application protection to a client facility 144 computing resource. The security management facility 122 may have the ability to scan the client facility 144 files for malicious code, remove or quarantine certain applications and files, prevent certain actions, perform remedial actions and perform other security measures. In embodiments, scanning the client facility 144 may include scanning some or all of the files stored to the client facility 144 on a periodic basis, may scan applications once the application has been requested to execute, may scan files as the files are transmitted to or from the client facility 144, or the like. The scanning of the applications and files may be to detect known malicious code or known unwanted applications. In an embodiment, new malicious code and unwanted applications may be continually developed and distributed, and updates to the known code database may be provided on a periodic basis, on a demand basis, on an alert basis, or the like.

In an embodiment, the security management facility 122 may provide for email security and control, where security management may help to eliminate spam, viruses, spyware and phishing, control of email content, and the like. The security management facilities 122 email security and control may protect against inbound and outbound threats, protect email infrastructure, prevent data leakage, provide spam filtering, and the like. In an embodiment, security management facility 122 may provide for web security and control, where security management may help to detect or block viruses, spyware, malware, unwanted applications, help control web browsing, and the like, which may provide comprehensive web access control enabling safe, productive web browsing. Web security and control may provide internet use policies, reporting on suspect devices, security and content filtering, active monitoring of network traffic, URI filtering, and the like. In an embodiment, the security management facility 122 may provide for network access control, which may provide control over network connections. Network control may stop unauthorized, guest, or non-compliant systems from accessing networks, and may control network traffic that may not be bypassed from the client level. In addition, network access control may control access to virtual private networks (VPN), where VPNs may be a communications network tunneled through another network, establishing a logical connection acting as a virtual network. In embodiments, a VPN may be treated in the same manner as a physical network.

In an embodiment, the security management facility 122 may provide for host intrusion prevention through behavioral based protection, which may guard against unknown threats by analyzing behavior before software code executes. Behavioral based protection may monitor code when it runs and intervene if the code is deemed to be suspicious or malicious. Advantages of behavioral based protection over runtime protection may include code being prevented from running, whereas runtime protection may only interrupt code that has already partly executed; behavioral protection may identify malicious code at the gateway or on the file servers and deletes it before reaching end-point computers and the like.

In an embodiment, the security management facility 122 may provide for reputation filtering, which may target or identify sources of known malware. For instance, reputation filtering may include lists of URIs of known sources of malware or known suspicious IP addresses, or domains, say for spam, that when detected may invoke an action by the threat management facility 100, such as dropping them immediately. By dropping the source before any interaction can initiate, potential threat sources may be thwarted before any exchange of data can be made.

In embodiments, information may be sent from the enterprise back to a third party, a vendor, or the like, which may lead to improved performance of the threat management facility 100. For example, the types, times, and number of virus interactions that a client experiences may provide useful information for the preventions of future virus threats. This type of feedback may be useful for any aspect of threat detection. Feedback of information may also be associated with behaviors of individuals within the enterprise, such as being associated with most common violations of policy, network access, unauthorized application loading, unauthorized external device use, and the like. In embodiments, this type of information feedback may enable the evaluation or profiling of client actions that are violations of policy that may provide a predictive model for the improvement of enterprise policies.

In an embodiment, the security management facility 122 may provide for the overall security of the enterprise facility 102 network or set of enterprise facility 102 networks, may provide updates of malicious code information to the enterprise facility 102 network, and associated client facilities 144. The updates may be a planned update, an update in reaction to a threat notice, an update in reaction to a request for an update, an update based on a search of known malicious code information, or the like. The administration facility 134 may provide control over the security management facility 122 when updates are performed. The updates may be automatically transmitted without an administration facility's 134 direct control, manually transmitted by the administration facility 134, or the like. The security management facility 122 may include the management of receiving malicious code descriptions from a provider, distribution of malicious code descriptions to enterprise facility 102 networks, distribution of malicious code descriptions to client facilities 144, or the like. In an embodiment, the management of malicious code information may be provided to the enterprise facility's 102 network, where the enterprise facility's 102 network may provide the malicious code information through the enterprise facility's 102 network distribution system.

The threat management facility 100 may provide policy management facility 112 that may be able to block non-malicious applications, such as VoIP 164, instant messaging 162, peer-to-peer file-sharing, and the like, that may undermine productivity and network performance within the enterprise facility 102. The policy management facility 112 may be a set of rules or policies that may indicate enterprise facility 102 access permissions for the client facility 144, such as access permissions associated with the network, applications, external computer devices, and the like. The policy management facility 112 may include a database, a text file, a combination of databases and text files, or the like. In an embodiment, a policy database may be a block list, a black list, an allowed list, a white list, or the like that may provide a list of enterprise facility 102 external network locations/applications that may or may not be accessed by the client facility 144. The policy management facility 112 may include rules that may be interpreted with respect to an enterprise facility 102 network access request to determine if the request should be allowed. The rules may provide a generic rule for the type of access that may be granted; the rules may be related to the policies of an enterprise facility 102 for access rights for the enterprise facility's 102 client facility 144. For example, there may be a rule that does not permit access to sporting websites. When a website is requested by the client facility 144, a security facility may access the rules within a policy facility to determine if the requested access is related to a sporting website. In an embodiment, the security facility may analyze the requested website to determine if the website matches with any of the policy facility rules.

The policy management facility 112 may be similar to the security management facility 122 but with the distribution of enterprise facility 102 wide access rules and policies that may maintain control of the access of client facility 144 to enterprise facility 102 network resources. The policies may be defined for application type, subset of application capabilities, organization hierarchy, computer facility type, user type, network location, time of day, connection type, or the like. Policies may be maintained by the administration facility 134, through the threat management facility 100, in association with a third party, or the like. For example, a policy may restrict IM 162 activity to only support personnel for communicating with customers. This may allow communication for departments requiring access, but may maintain the network bandwidth for other activities by restricting the use of IM 162 to only the personnel that need access to IM 162 in support of the enterprise facility 102. In an embodiment, the policy management facility 112 may be a standalone application, may be part of the policy management facility 112, network server facility 142, may be part of the enterprise facility 102 network, may be part of the client facility 144, or the like.

In embodiments, the threat management facility 100 may provide configuration management, which may be similar to policy management, but may specifically examine the configuration set of applications, operating systems, hardware, and the like, and managing changes to their configurations. Assessment of a configuration may be made against a standard configuration policy, detection of configuration changes, remediation of improper configuration, application of new configurations, and the like. An enterprise may keep a set of standard configuration rules and policies which may represent the desired state of the device. For example, a client firewall may be running and installed, but in the disabled state, where remediation may be to enable the firewall. In another example, the enterprise may set a rule that disallows the use of USB disks, and sends a configuration change to all clients, which turns off USB drive access via a registry.

In embodiments, the threat management facility 100 may also provide for the removal of applications that may interfere with the operation of the threat management facility 100, such as competitor products that may also be attempting similar threat management functions. The removal of such products may be initiated automatically whenever such products are detected. In the case where such applications are services are provided indirectly through a third-party product, the application may be suspended until action is taken to remove or disable the third-party product's protection facility.

Threat management against a sometimes quickly evolving malware environment may require timely updates, and the update management facility 120 may be provided by the threat management facility 100. In addition, a policy management facility 112 may also require update management (e.g. as provided by the update facility 120 herein described), as the enterprise facility 102 requirements for policies change enterprise facility 102, client facility 144, server facility 142 enterprise facility 102. The update management for the security facility 122 and policy management facility 112 may be provided directly by the threat management facility 100, such as by a hosted system or in conjunction with the administration facility 134. In embodiments, the threat management facility 100 may provide for patch management, where a patch may be an update to an operating system, an application, a system tool, or the like, where one of the reasons for the patch is to reduce vulnerability to threats.

In embodiments, the security facility 122 and policy management facility 112 may push information to the enterprise facility 102 network and/or client facility 144, the enterprise facility 102 network and/or client facility 144 may pull information from the security facility 122 and policy management facility 112 network server facilities 142, there may be a combination of pushing and pulling of information between the security facility 122 and the policy management facility 112 network servers 142, enterprise facility 102 network, and client facilities 144, or the like. For example, the enterprise facility 102 network and/or client facility 144 may pull information from the security facility 122 and policy management facility 112 network server facility 142 may request the information using the security facility 122 and policy management facility 112 update module; the request may be based on a certain time period, by a certain time, by a date, on demand, or the like. In another example, the security facility 122 and policy management facility 112 network servers 142 may push the information to the enterprise facility's 102 network and/or client facility 144 by providing notification that there are updates available for download and then transmitting the information. The combination of the security management 122 network server facility 142 and security update module may function substantially the same as the policy management facility 112 network server and policy update module by providing information to the enterprise facility 102 network and the client facility 144 in a push or pull method. In an embodiment, the policy management facility 112 and the security facility 122 management update modules may work in concert to provide all the needed information to the enterprise facility's 102 network and/or client facility 144 for control of application execution. In an embodiment, the policy update module and security update module may be combined into a single update module.

As threats are identified and characterized, the threat management facility 100 may create definition updates that may be used to allow the threat management facility 100 to detect and remediate the latest malicious software, unwanted applications, configuration and policy changes, and the like. The threat definition facility 114 may contain threat identification updates, also referred to as definition files. A definition file may be a virus identity file that may include definitions of known or potential malicious code. The IDE definition files may provide information that may identify malicious code within files, applications, or the like. The definition files may be accessed by security management facility 122 when scanning files or applications within the client facility 144 for the determination of malicious code that may be within the file or application. The definition files may contain a number of commands, definitions, or instructions, to be parsed and acted upon, or the like. In embodiments, the client facility 144 may be updated with new definition files periodically to provide the client facility 144 with the most recent malicious code definitions; the updating may be performed on a set time period, may be updated on demand from the client facility 144, may be updated on demand from the network, may be updated on a received malicious code alert, or the like. In an embodiment, the client facility 144 may request an update to the definition files from an update facility 120 within the network, may request updated definition files from a computing facility external to the network, updated definition files may be provided to the client facility 114 from within the network, definition files may be provided to the client facility 144 from an external computing facility from an external network, or the like.

In an embodiment, a definition management facility 114 may provide for the timely updates of definition files information to the network, client facilities 144, and the like. New and altered malicious code and malicious applications may be continually created and distributed to networks worldwide. The definition files that maintain the definitions of the malicious code and malicious application information for the protection of the networks and client facilities 144 may need continual updating to provide continual defense of the network and client facility 144 from the malicious code and malicious applications. The definition files management may provide for automatic and manual methods of updating the definition files. In embodiments, the network may receive definition files and distribute the definition files to the network client facilities 144, the client facilities 144 may receive the definition files directly, or the network and client facilities 144 may both receive the definition files, or the like. In an embodiment, the definition files may be updated on a fixed periodic basis, on demand by the network and/or the client facility 144, as a result of an alert of a new malicious code or malicious application, or the like. In an embodiment, the definition files may be released as a supplemental file to an existing definition files to provide for rapid updating of the definition files.

In a similar manner, the security management facility 122 may be used to scan an outgoing file and verify that the outgoing file is permitted to be transmitted per the enterprise facility 102 rules and policies. By checking outgoing files, the security management facility 122 may be able discover malicious code infected files that were not detected as incoming files as a result of the client facility 144 having been updated with either new definition files or policy management facility 112 information. The definition files may discover the malicious code infected file by having received updates of developing malicious code from the administration facility 134, updates from a definition files provider, or the like. The policy management facility 112 may discover the malicious code infected file by having received new updates from the administration facility 134, from a rules provider, or the like.

The threat management facility 100 may provide for a way to control access to the enterprise facility 102 networks. For instance, the enterprise facility 102 may want to restrict access to certain applications, networks, files, printers, servers, databases, or the like. In addition, the enterprise facility 102 may want to restrict user access under certain conditions, such as the user's location, usage history, need to know, job position, connection type, time of day, method of authentication, client-system configuration, or the like. Network access rules may be developed by the enterprise facility 102, or pre-packaged by a supplier, and managed by the threat management facility 100 in conjunction with the administration facility 134. Network access rules and control may be responsible for determining if a client facility 144 application should be granted access to a requested network location. The network location may be on the same network as the facility or may be on another network. In an embodiment, the network access control may verify access rights for client facilities 144 from within the network or may verify access rights of computer facilities from external networks. When network access for a client facility 144 is denied, the network access control may send an information file to the client facility 144, the information file may contain data or commands that may provide instructions for the remedial action facility 128. The information sent by the network access facility 124 control may be a data file. The data file may contain a number of commands, definitions, instructions, or commands to be parsed and acted upon through the remedial action facility 128, or the like. The information sent by the network access facility 124 control may be a command or command file that the remedial action facility 128 may access and take action upon.

In an embodiment, the network access rules 124 may provide an information store to be accessed by the network access control. The network access rules facility 124 may include databases such as a block list, a black list, an allowed list, a white list, an unacceptable network site database, an acceptable network site database, a network site reputation database, or the like of network access locations that may or may not be accessed by the client facility 144. Additionally, the network access rules facility 124 may incorporate rule evaluation; the rule evaluation may parse network access requests and apply the parsed information to network access rules. The network access rule facility 124 may have a generic set of rules that may be in support of an enterprise facility's 102 network access policies, such as denying access to certain types of websites 158, controlling instant messenger 162 accesses, or the like. Rule evaluation may include regular expression rule evaluation, or other rule evaluation method for interpreting the network access request and comparing the interpretation to the established rules for network access. In an embodiment, the network access rules facility 124 may receive a rules evaluation request from the network access control and may return the rules evaluation to the network access control.

Similar to the threat definitions facility 114, the network access rule facility 124 may provide updated rules and policies to the network access rules facility 124. The network access rules facility 124 may be maintained by the network administration facility 134 using the network access rules facility 124 management. In an embodiment, the network administration facility 134 may be able to maintain a set of access rules manually by adding rules, changing rules, deleting rules, or the like. Additionally, the administration facility 134 may be able to retrieve predefined rule sets from a provider that may provide a set of rules to be applied to an entire enterprise facility 102. The network administration facility 134 may be able to modify the predefined rules as needed for a particular enterprise facility 102 using the network access rules management facility 124.

When a threat or policy violation is detected by the threat management facility 100, the threat management facility 100 may provide for a remedial action facility 128. Remedial action may take a plurality of forms, such as terminating or modifying an ongoing process or interaction, sending a warning to a client or administration facility 134 of an ongoing process or interaction, executing a program or application to remediate against a threat or violation, record interactions for subsequent evaluation, or the like. Remedial action may be associated with an application that responds to information that a client facility 144 network access request has been denied. In an embodiment, when the data file is received, remedial action may parse the data file, interpret the various aspects of the data file, and act on the parsed data file information to determine actions to be taken on an application requesting access to a denied network location. In an embodiment, when the data file is received, remedial action may access the threat definitions to parse the data file and determine an action to be taken on an application requesting access to a denied network location. In an embodiment, the information received from the facility may be a command or a command file. The remedial action facility may carry out any commands that are received or parsed from a data file from the facility without performing any interpretation of the commands. In an embodiment, the remedial action facility may interact with the received information and may perform various actions on a client requesting access to a denied network location. The action may be one or more of continuing to block all requests to a denied network location, a malicious code scan on the application, a malicious code scan on the client facility 144, quarantine of the application, terminating the application, isolation of the application, isolation of the client facility 144 to a location within the network that restricts network access, blocking a network access port from a client facility 144, reporting the application to a administration facility 134, or the like.

Remedial action may be provided as a result of a detection of a threat or violation. The detection techniques facility 130 may include monitoring the enterprise facility 102 network or end-point devices, such as by monitoring streaming data through the gateway, across the network, through routers and hubs, and the like. The detection techniques facility 130 may include monitoring activity and stored files on computing facilities, such as on server facilities 142, desktop computers, laptop computers, other mobile computing devices, and the like. Detection techniques, such as scanning a computer's stored files, may provide the capability of checking files for stored threats, either in the active or passive state. Detection techniques, such as streaming file management, may provide the capability of checking files received at the network, gateway facility, client facility 144, and the like. This may provide the capability of not allowing a streaming file or portions of the streaming file containing malicious code from entering the client facility 144, gateway facility, or network. In an embodiment, the streaming file may be broken into blocks of information, and a plurality of virus identities may be used to check each of the blocks of information for malicious code. In an embodiment, any blocks that are not determined to be clear of malicious code may not be delivered to the client facility 144, gateway facility, or network.

Verifying that the threat management facility 100 is detecting threats and violations to established policy, may require the ability to test the system, either at the system level or for a particular computing component. The testing facility 118 may allow the administration facility 134 to coordinate the testing of the security configurations of client facility 144 computing facilities on a network. The administration facility 134 may be able to send test files to a set of client facility 144 computing facilities to test the ability of the client facility 144 to determine acceptability of the test file. After the test file has been transmitted, a recording facility may record the actions taken by the client facility 144 in reaction to the test file. The recording facility may aggregate the testing information from the client facility 144 and report the testing information to the administration facility 134. The administration facility 134 may be able to determine the level of preparedness of the client facility 144 computing facilities by the reported information. Remedial action may be taken for any of the client facility 144 computing facilities as determined by the administration facility 134; remedial action may be taken by the administration facility 134 or by the user of the client facility 144.

The threat research facility 132 may provide a continuously ongoing effort to maintain the threat protection capabilities of the threat management facility 100 in light of continuous generation of new or evolved forms of malware. Threat research may include researchers and analysts working on known and emerging malware, such as viruses, rootkits a spyware, as well as other computer threats such as phishing, spam, scams, and the like. In embodiments, through threat research, the threat management facility 100 may be able to provide swift, global responses to the latest threats.

The threat management facility 100 may provide threat protection to the enterprise facility 102, where the enterprise facility 102 may include a plurality of networked components, such as client facility 144, server facility 142, DNS server facility 210, administration facility 134, firewall 138, gateway, hubs 148, routers, threat management appliance 140, desktop users, mobile users, and the like. In embodiments, it may be the end-point computer security facility 152, located on a computer's desktop, which may provide threat protection to a user, and associated enterprise facility 102. In embodiments, the term end-point may refer to a computer system that may source data, receive data, evaluate data, buffer data, or the like, such as a user's desktop computer as an end-point computer, a firewall as a data evaluation end-point computer system, a laptop as a mobile end-point computer, a PDA as a hand-held end-point computer. In embodiments, end-point may refer to a source or destination for data, including such components where the destination is characterized by an evaluation point for data, and where the data may be sent to a subsequent destination after evaluation. The end-point computer security facility 152 may be an application loaded onto the computer platform or computer support component, where the application may accommodate the plurality of computer platforms and/or functional requirements of the component. For instance, a client facility 144 computer may be one of a plurality of computer platforms, such as Windows, Macintosh, Linux, and the like, where the end-point computer security facility 152 may be adapted to the specific platform, while maintaining a uniform product and product services across platforms. Additionally, components may have different functions to serve within the enterprise facility's 102 networked computer-based infrastructure. For instance, computer support components provided as hubs 148, routers, server facility 142, DNS server facility 210, firewalls 138, and the like, may require unique security application software to protect their portion of the system infrastructure, while providing an element in an integrated threat management system that extends out beyond the threat management facility 100 to incorporate all computer resources under its protection.

The enterprise facility 102 may include a plurality of client facility 144 computing platforms on which the end-point computer security facility 152 is adapted. A client facility 144 computing platform may be a computer system that is able to access a service on another computer, such as a server facility 142, via a network. This client facility 144 server facility 142 model may apply to a plurality of networked applications, such as a client facility 144 connecting to an enterprise facility 102 application server facility 142, a web browser client facility 144 connecting to a web server facility 142, an e-mail client facility 144 retrieving e-mail from an internet 154 service provider's mail storage servers 142, and the like. In embodiments, traditional large client facility 144 applications may be switched to websites, which may increase the browser's role as a client facility 144. Clients 144 may be classified as a function of the extent to which they perform their own processing. For instance, client facilities 144 are sometimes classified as a fat client facility 144 or thin client facility 144. The fat client facility 144, also known as a thick client facility 144 or rich client facility 144, may be a client facility 144 that performs the bulk of data processing operations itself, and does not necessarily rely on the server facility 142. The fat client facility 144 may be most common in the form of a personal computer, where the personal computer may operate independent of any server facility 142. Programming environments for fat clients 144 may include CURI, Delphi, Droplets, Java, win32, X11, and the like. Thin clients 144 may offer minimal processing capabilities, for instance, the thin client facility 144 may primarily provide a graphical user interface provided by an application server facility 142, which may perform the bulk of any required data processing. Programming environments for thin clients 144 may include JavaScript/AJAX, ASP, JSP, Ruby on Rails, Python's Django, PHP, and the like. The client facility 144 may also be a mix of the two, such as processing data locally, but relying on a server facility 142 for data storage. As a result, this hybrid client facility 144 may provide benefits from both the fat client facility 144 type, such as multimedia support and high performance, and the thin client facility 144 type, such as high manageability and flexibility. In embodiments, the threat management facility 100, and associated end-point computer security facility 152, may provide seamless threat protection to the plurality of clients 144, and client facility 144 types, across the enterprise facility 102.

The enterprise facility 102 may include a plurality of server facility 142, such as application servers 142, communications servers 142, file servers 142, database servers 142, proxy servers 142, mail servers 142, fax servers 142, game servers 142, web servers 142, and the like. A server facility 142, which may also be referred to as a server facility 142 application, server facility 142 operating system, server facility 142 computer, or the like, may be an application program or operating system that accepts client facility 144 connections in order to service requests from clients 144. The server facility 142 application may run on the same computer as the client facility 144 using it, or the server facility 142 and the client facility 144 may be running on different computers and communicating across the network. Server facility 142 applications may be divided among server facility 142 computers, with the dividing depending upon the workload. For instance, under light load conditions all server facility 142 applications may run on a single computer and under heavy load conditions a single server facility 142 application may run on multiple computers. In embodiments, the threat management facility 100 may provide threat protection to server facilities 142 within the enterprise facility 102 as load conditions and application changes are made.

A server facility 142 may also be an appliance facility 140, where the appliance facility 140 provides specific services onto the network. Though the appliance facility 140 is a server facility 142 computer, that may be loaded with a server facility 142 operating system and server facility 142 application, the enterprise facility 102 user may not need to configure it, as the configuration may have been performed by a third party. In an embodiment, an enterprise facility 102 appliance may be a server facility 142 appliance that has been configured and adapted for use with the threat management facility 100, and located within the facilities of the enterprise facility 102. The enterprise facility's 102 threat management appliance may enable the enterprise facility 102 to administer an on-site local managed threat protection configuration, where the administration facility 134 may access the threat resources through an interface, such as a web portal. In an alternate embodiment, the enterprise facility 102 may be managed remotely from a third party, vendor, or the like, without an appliance facility 140 located within the enterprise facility 102. In this instance, the appliance functionality may be a shared hardware product between pluralities of enterprises 102. In embodiments, the appliance facility 140 may be located at the enterprise facility 102, where the enterprise facility 102 maintains a degree of control. In embodiments, a hosted service may be provided, where the appliance 140 may still be an on-site black box to the enterprise facility 102, physically placed there because of infrastructure requirements, but managed by a third party, vendor, or the like.

Simple server facility 142 appliances may also be utilized across the enterprise facility's 102 network infrastructure, such as switches, routers, wireless routers, hubs 148, gateways, print servers 142, net modems, and the like. These simple server facility appliances may not require configuration by the enterprise facility 102, but may require protection from threats via an end-point computer security facility 152. These appliances may provide interconnection services within the enterprise facility 102 network, and therefore may advance the spread of a threat if not properly protected.

One way for a client facility 144 to be protected from threats from within the enterprise facility 102 network may be a personal firewall. A personal firewall may be an application that controls network traffic to and from a client, permitting or denying communications based on a security policy. Personal firewalls may be designed for use by end-users, which may result in protection for only the computer on which it's installed. Personal firewalls may be able to control network traffic by providing prompts each time a connection is attempted and adapting security policy accordingly. Personal firewalls may also provide some level of intrusion detection, which may allow the software to terminate or block connectivity where it suspects an intrusion is being attempted. Other features that may be provided by a personal firewall may include alerts about outgoing connection attempts, control of program access to networks, hiding the client from port scans by not responding to unsolicited network traffic, monitoring of applications that may be listening for incoming connections, monitoring and regulation of incoming and outgoing network traffic, prevention of unwanted network traffic from installed applications, reporting applications that make connection attempts, reporting destination servers with which applications may be attempting communications, and the like. In embodiments, the personal firewall may be provided by the treat management facility 100.

Another important component that may be protected by an end-point computer security facility 152 is a network firewall facility 138, which may be a hardware or software device that may be configured to permit, deny, or proxy data through a computer network that has different levels of trust in its source of data. For instance, an internal enterprise facility 102 network may have a high level of trust, because the source of all data has been sourced from within the enterprise facility 102. An example of a low level of trust is the Internet 154, because the source of data may be unknown. A zone with an intermediate trust level, situated between the Internet 154 and a trusted internal network, may be referred to as a "perimeter network". Since firewall facilities 138 represent boundaries between threat levels, the end-point computer security facility 152 associated with the firewall facility 138 may provide resources that may control the flow of threats at this enterprise facility 102 network entry point. Firewall facilities 138, and associated end-point computer security facility 152, may also be associated with a network node that may be equipped for interfacing between networks that use different protocols. In embodiments, the end-point computer security facility 152 may provide threat protection in a plurality of network infrastructure locations, such as at the enterprise facility 102 network entry point, i.e. the firewall facility 138 or gateway; at the server facility 142; at distribution points within the network, i.e. the routers and hubs 148; at the desktop of client facility 144 computers; and the like. In embodiments, the most effective location for threat detection may be at the user's computer desktop end-point computer security facility 152.

The interface between the threat management facility 100 and the enterprise facility 102, and through the appliance facility 140 to embedded end-point computer security facilities, may include a set of tools that may be the same for all enterprise implementations, but allow each enterprise to implement different controls. In embodiments, these controls may include both automatic actions and managed actions. Automatic actions may include downloads of the end-point computer security facility 152 to components of the enterprise facility 102, downloads of updates to existing end-point computer security facilities of the enterprise facility 102, uploaded network interaction requests from enterprise facility 102 components to the threat management facility 100, and the like. In embodiments, automatic interactions between the enterprise facility 102 and the threat management facility 100 may be configured by the threat management facility 100 and an administration facility 134 in the enterprise facility 102. The administration facility 134 may configure policy rules that determine interactions, such as developing rules for accessing applications, as in who is authorized and when applications may be used; establishing rules for ethical behavior and activities; rules governing the use of entertainment software such as games, or personal use software such as IM 162 and VoIP 164; rules for determining access to enterprise facility 102 computing resources, including authentication, levels of access, risk assessment, and usage history tracking; rules for when an action is not allowed, such as whether an action is completely deigned or just modified in its execution; and the like. The administration facility 134 may also establish license management, which in turn may further determine interactions associated with a licensed application. In embodiments, interactions between the threat management facility 100 and the enterprise facility 102 may provide threat protection to the enterprise facility 102 by managing the flow of network data into and out of the enterprise facility 102 through automatic actions that may be configured by the threat management facility 100 or the administration facility 134.

Client facilities 144 within the enterprise facility 102 may be connected to the enterprise facility 102 network by way of wired network facilities 148 or wireless network facilities 150. Client facilities 144 connected to the enterprise facility 102 network via a wired facility 148 or wireless facility 150 may receive similar protection, as both connection types are ultimately connected to the same enterprise facility 102 network, with the same end-point computer security facility 152, and the same threat protected enterprise facility 102 environment. Mobile wireless facility 150 clients 144, because of their ability to connect to any wireless 150 network access point, may connect to the internet 154 outside the enterprise facility 102, and therefore outside the threat-protected environment of the enterprise facility 102. In this instance the mobile client facility 144, if not for the presence of the end-point computer security facility 152 may experience a malware attack or perform actions counter to enterprise facility 102 established policies. In addition, there may be a plurality of ways for the threat management facility 100 to protect the out-of-enterprise facility 102 mobile client facility 144 that has an embedded end-point computer security facility 152, such as by providing URI filtering in personal routers, using a web appliance as a DNS proxy, or the like. Mobile client facilities 144 that are components of the enterprise facility 102 but temporarily outside connectivity with the enterprise facility 102 network, may be provided with the same threat protection and policy control as client facilities 144 inside the enterprise facility 102. In addition, mobile client facilities 144 may receive the same interactions to and from the threat management facility 100 as client facilities 144 inside the enterprise facility 102, where mobile client facilities 144 may be considered a virtual extension of the enterprise facility 102, receiving all the same services via their embedded end-point computer security facility 152.

Interactions between the threat management facility 100 and the components of the enterprise facility 102, including mobile client facility 144 extensions of the enterprise facility 102, may ultimately be connected through the internet 154. Threat management facility 100 downloads and upgrades to the enterprise facility 102 may be passed from the firewalled networks of the threat management facility 100 through to the end-point computer security facility 152 equipped components of the enterprise facility 102. In turn the end-point computer security facility 152 components of the enterprise facility 102 may upload policy and access requests back across the internet 154 and through to the threat management facility 100. The Internet 154 however, is also the path through which threats may be transmitted from their source. These network threats may include threats from a plurality of sources, including websites 158, e-mail 160, IM 162, VoIP 164, application software, and the like. These threats may attempt to attack a mobile enterprise facility 102 client facility 144 equipped with an end-point computer security facility 152, but in embodiments, as long as the mobile client facility 144 is embedded with an end-point computer security facility 152, as described above, threats may have no better success than if the mobile client facility 144 where inside the enterprise facility 102.

However, if the mobile client facility 144 were to attempt to connect into an unprotected connection point, such as at a secondary location 108 that is not a part of the enterprise facility 102, the mobile client facility 144 may be required to request network interactions through the threat management facility 100, where contacting the threat management facility 100 may be performed prior to any other network action. In embodiments, the client facility's 144 end-point computer security facility 152 may manage actions in unprotected network environments such as when the client facility 144 is in a secondary location 108 or connecting wirelessly 150 to a non-enterprise facility 102 wireless internet 154 connection, where the end-point computer security facility 152 may dictate what actions are allowed, blocked, modified, or the like. For instance, if the client facility's 144 end-point computer security facility 152 is unable to establish a secured connection to the threat management facility 100, the end-point computer security facility 152 may inform the user of such, and recommend that the connection not be made. In the instance when the user chooses to connect despite the recommendation, the end-point computer security facility 152 may perform specific actions during or after the unprotected connection is made, including running scans during the connection period, running scans after the connection is terminated, storing interactions for subsequent threat and policy evaluation, contacting the threat management facility 100 upon first instance of a secured connection for further actions and or scanning, restricting access to network and local resources, or the like. In embodiments, the end-point computer security facility 152 may perform specific actions to remediate possible threat incursions or policy violations during or after the unprotected connection.

The secondary location 108 may have no end-point computer security facilities 152 as a part of its computer components, such as its firewalls 138, servers 142, clients 144, hubs 148, wireless hubs 150, and the like. As a result, the computer components of the secondary location 108 may be open to threat attacks, and become potential sources of threats, as well as any mobile enterprise facility 102 clients 144 that may be connected to the secondary location's 108 network. In this instance, these computer components may now unknowingly spread a threat to other components connected to the network.

Some threats may not come directly from the Internet 154, such as from non-enterprise facility 102 controlled mobile devices that are physically brought into the enterprise facility 102 and connected to the enterprise facility 102 client facilities 144. The connection may be made from direct connection with the enterprise facility's 102 client facility 144, such as through a USB port, or in physical proximity with the enterprise facility's 102 client facility 144 such that a wireless facility 150 connection can be established, such as through a Bluetooth connection. These physical proximity threats 110 may be another mobile computing device, a portable memory storage device, a mobile communications device, or the like, such as CDs and DVDs 170, memory stick 174, flash drive 174, external hard drive, cell phone 178, PDAs 180, MP3 players, digital cameras, point-to-point devices, digital picture frames, digital pens, navigation devices, appliances, and the like. A physical proximity threat 110 may have been previously infiltrated by network threats while connected to an unprotected network connection outside the enterprise facility 102, and when connected to the enterprise facility 102 client facility 144, pose a threat. Because of their mobile nature, physical proximity threats 110 may infiltrate computing resources in any location, such as being physically brought into the enterprise facility 102 site, connected to an enterprise facility 102 client facility 144 while that client facility 144 is mobile, plugged into an unprotected client facility 144 at a secondary location 108, and the like. A mobile device, once connected to an unprotected computer resource, may become a physical proximity threat 110. In embodiments, the end-point computer security facility 152 may provide enterprise facility 102 computing resources with threat protection against physical proximity threats 110, for instance, through scanning the device prior to allowing data transfers, through security validation certificates, through establishing a safe zone within the enterprise facility 102 computing resource to transfer data into for evaluation, and the like.

Now that the overall system has been described, we turn towards a set of contextual scanning embodiments. It should be understood that the following embodiments may be managed through a threat management facility 100 along with other services, such as those described herein.

One aspect of secure computing is the scanning of data as it is received from a source for the purpose of blocking that data, such as for the scanning and identification of malware, confidential materials, restricted materials, inappropriate materials, and the like. One known method for the blocking of received data employs blacklists for the blocking of known sources of data, where lists of URIs, users, locations, addresses, and the like, are accumulated as they are found to match the content that is to be blocked. However, individuals bent on circumventing blacklists often obfuscate their source, such as by changing their URIs. As such, blacklists may be ineffectual in identifying these files for actions.

In embodiments, identifying content through a scanning facility may be done for a number of reasons. One reason may be the potential for unintentionally receiving malware, and the need to block the malware upon reception before the malware has the chance to do any damage. Traditionally, one way malware may be identified is with identity files utilized by the scanning facility. However, the chances of identifying the malware may be greatly increased if the scanning facility is able to scan the received content in light of some information associated with the file, the address, the URI, the source, the sender, and the like. Similarly, this technique may be used against file transfers that are potentially less malicious, such unauthorized transfers, downloading or uploading confidential files from within or outside an enterprise, the downloading or transfer of inappropriate content, and the like. The present invention may allow for a technique, where the content being retrieved, and information associated with the request or source of the information, may both be made available to the scanning facility to increase the potential for targeted content to be identified.

In embodiments, the present invention may provide a way to examine the received data for contextual information that may indicate the source of the data being scanned for. This contextual information may take a plurality of forms, such as being a part of a changing address sequence, a pattern in the way a file is delivered, a pattern in the way a file is sourced, the locale of the file, and the like. The information may be considered contextual in that it may be information that accompanies, proceeds, follows, is embedded, and the like, in the data that is received. The present invention may identify and store the contextual information for use in a scanning facility, where the scanning facility may utilize both the contextual information and the received data in identifying target content. In embodiments, policy management 112 may be associated with the process of the present invention, such as by providing storage of contextual information, client request restrictions, locale restrictions, policy rules defining what content is to be scanned for, policy rules specifying actions to be taken, and the like.

In embodiments, contextual information may be used in scanning in association with a client request, where the user request is examined for contextual information in conjunction with policy management 112 and used along with the retrieved content during scanning. Contextual information associated with the request by the client may contain patterns that may be utilized during scanning for the identification of target content to be blocked. This pattern may be a static pattern, a changing pattern, an unchanging pattern, a sequence that has been previously stored as a part of policy management 112, a pattern recognized by an identity file that is part of the scanning facility, and the like. For example, the contextual information may be an unchanging portion of a received address or data, where the changing portion is the portion providing unique information to avoid blacklisting. Further, the pattern may be realized across a sequence of addresses, such as breaking the delivery of content into a series of sub-deliverables, each with their own address. For instance, malware may be configured for delivery to a client machine with a unique sequence of addresses, such as www.badaaa.com, www.badbbb.com, www.badccc.com, and the like. These addresses may never have been used before, and therefore may not be included on any blacklist. Upon reception of the first address in the series, some characteristic may be recognized, such as an unusual embedded sequence, a recognized embedded sequence, and the like, and action may be taken upon scanning the retrieved content along with this contextual information. On the other hand, the contextual information noted in the first address might not be enough evidence to warrant immediate action, but similar looking addresses may be watched for thereafter, and thus allow the scanning facility to be ready to help identify a subsequently received address. In this way, contextual information associated with a client request may be used in conjunction with the retrieved content to improve the chances for the scanning facility to identify a targeted content.

In embodiments, contextual information may be used in scanning in association with a requested file and the locale of the machine providing the file, where the locale information associated with the source machine may be used along with the retrieved file in scanning the file for target content to be blocked. For example, a first client may request a file from a second client. The second client, representing the source locale for the file, may provide contextual information in the form of locale information. Locale information may in turn be used in conjunction with policy management locale restrictions to improve the ability for the scanning facility to identify and block targeted content. In embodiments, the blocking based on locale contextual information may be realized through policy management restrictions, policy management rules, identity files associated with the scanning facility, and the like. In this way, contextual information associated with locale information may be used in conjunction with the retrieved content to improve the chances for the scanning facility to identify a targeted content.

Figure 2:
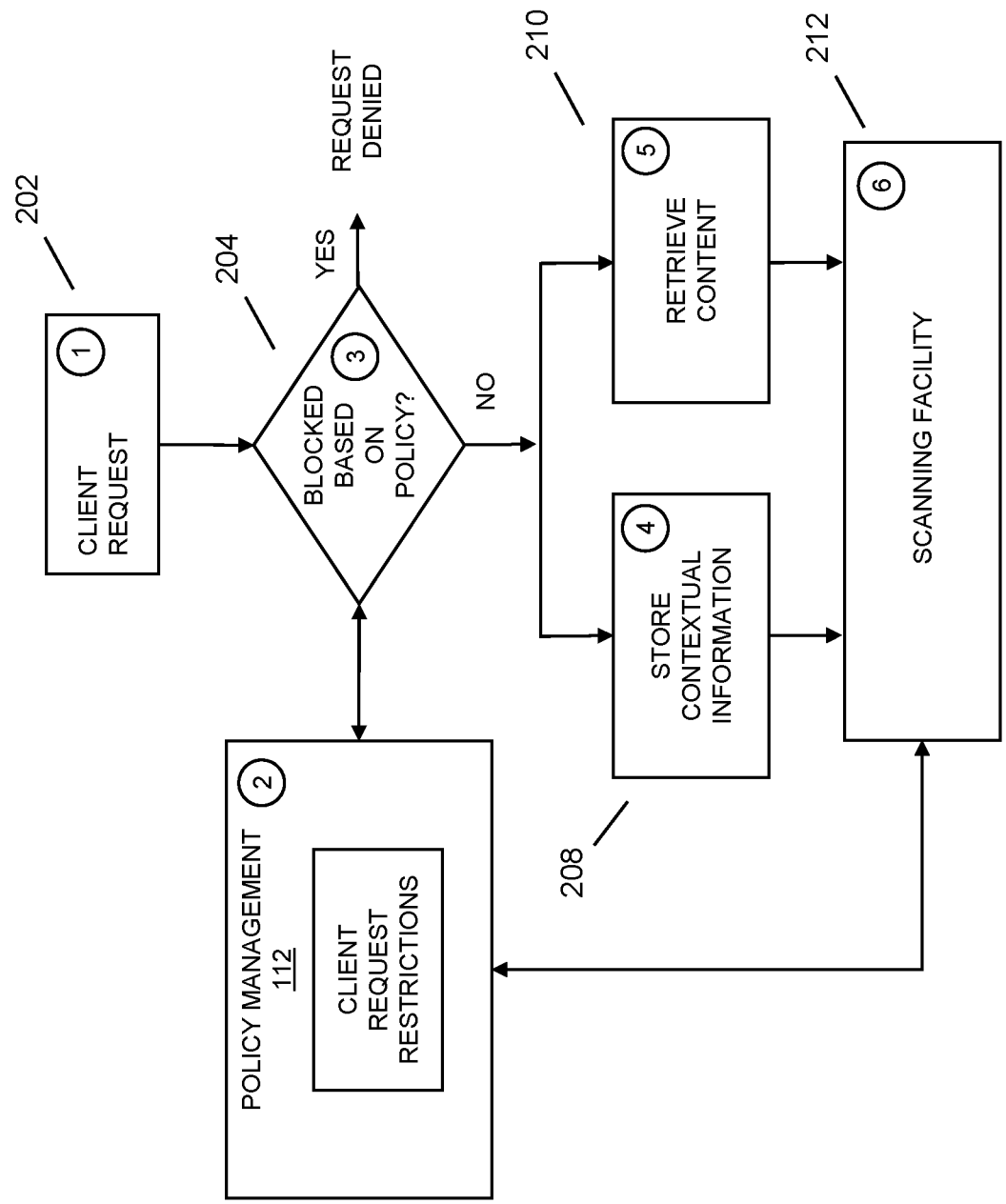
FIG. 2 depicts a flow diagram embodiment for contextual scanning in association with a client request.

FIG. 2 depicts a flow diagram for contextual scanning in association with a client request. To describe the flow diagram, reference will be made to FIG. 1, although it is understood that the flow diagram may be implemented in any other suitable environment or system. Further, the process flow embodiment is only an example and must not be taken in limiting sense.

At step one 202 of the flow diagram, a client in the client facility 144 may request access to a computing resource. Examples of the computing resource may be a computing application like a software file, a web page, an instant messaging service, a peer-to-peer file-sharing service, a VOIP service, a VPN service and the like. Examples of the computing resource may also be a network resource like an external network/location or it may be an external computer device. Another example of the computing resource requested by a client may be a request for a URI. A URI is a set of characters for identifying a resource in a computing environment. In an example, a URI may be a Uniform Resource Locator (URL). A URL is a URI that may identify a website address and may also identify the protocol that can be used to access the address. For example, the URL http://www.abcd.com may identify the web address of an organization "abcd". The URL also identifies the protocol for accessing the website i.e. HTTP. In another example, a URI may be a Uniform Resource Name (URN). A URN is a URI that identifies a resource but does not specify its location. An example of a URN may be a namespace rule for identification of MPEG metadata. In an embodiment, the client in the client facility 144 may request access to a URL, for example, the website http://www.abcd.com. Note that the URI http://www.abcd.com is used herein as an example URI, and is not intended to be limiting in any way.

In embodiments, the client in the client facility 144 may request the network server facility 142 for accessing the URI http://abcd.com. The network server facility 112 may include a web server that provides the client with access to the requested URI. In an example, the network server facility 142 may include appliances like routers, gateways, hubs, and the like, which can be utilized by the web server to provide the client with access to the requested URI. The network server facility 142 may interact with the threat management facility 100 through the Internet 154 to provide the client facility 144 with access to the requested URI. In an embodiment, the policy management facility 112 in the threat management facility 100 may be used to provide the client in the client facility 144 with access to the requested URI. The policy management facility may control access of the client facility 144 to the network resources of the enterprise facility 102. The policy management facility 112 may be a set of rules or policies that may indicate access permissions for the client facility 144, such as access permissions associated with the network, applications, external computer devices, and the like. In an embodiment, the policy management facility 112 may interact with the network access rules facility 124 for storing the set of rules or policies that may indicate access permissions for the client facility 144. The policy management facility may maintain restrictions associated with network requests. In an example, the network restrictions may include a list of URIs having known sources of malware or known suspicious IP addresses or domains.

At step two of the flow diagram, in an embodiment, the restrictions in the policy management facility 112 are reviewed in relation to the client request. In an example, the restrictions in the policy management facility 112 may include a list of URIs. At step three 204, it is decided whether the client request for access to a URI http://abcd.com should be allowed or denied based on the restrictions in the policy management facility 112. In an embodiment, if the URI http://abcd.com is in the list of restricted URIs with respect to a client request, the client request may be denied. In another embodiment, the network access rules facility 124 may be used to provide the client in the client facility 144 with access to the requested URI. The network access rules facility 124 may have a generic set of rules that may be in support of an enterprise facility's 102 network access policies, such as denying access to certain types of URIs.

In embodiments, if the URI http://abcd.com is not in the list of restricted URIs with respect to a client request, the process flow proceeds to step four 208 and step five 210. At step four 208, contextual information related to the client request is stored. In an embodiment, the administration facility 134 may extract the contextual information and store it in the policy management facility 112. The stored contextual information may be used in scanning for identification of malware, confidential materials, restricted materials, inappropriate materials, and the like. The contextual information may include data that is used for indicating the source or origin of the requested URI. The contextual information may be a part of a changing address sequence, a pattern in the way the URI is delivered, a pattern in the way the URI is sourced, the locale of the URI, and the like. The information may be considered contextual in that it may be information that accompanies, proceeds, follows, is embedded, and the like, in the URI that is requested.

At step five 210, the content in association with the client request is retrieved. In an example, the content associated with a client URI request may be the website content. In another example, if the URI requested by the client is a file download (HTTP download) through a URI, the retrieved content associated with the client request is the downloaded file. The content associated with the client request may be retrieved using a web server in the network server facility 142.

Thereafter, at step six 212, the scanning facility may utilize the stored contextual information to scan the retrieved content, to make an informed decision about granting the client in the client facility 144 access to the requested URI. In an embodiment, the scanning facility may be an Anti-Virus (AV) Engine that is associated with the security management facility 122, the client, a network component, and the like. In embodiments, the scanning facility may provide for the scanning of a plurality of different types of content as discussed herein. The scanning facility may scan the retrieved content for identifying content that needs to be blocked. In an example, the scanning facility may scan the retrieved content associated with the URI requested by the client. Content that may need to be blocked as a result of scanning by the scanning facility may be malware, confidential materials, restricted materials, inappropriate materials, and the like. In an embodiment, the scanning facility may access the policy management facility 112 to review the restrictions associated with the client request. The scanning facility may use the stored contextual information along with the client request restrictions for scanning retrieved content. In an example, the stored contextual information may be a source of the requested URI like a particular country of origin. The scanning facility may block client access to this URI if the client restrictions in the policy management facility 112 indicate blocking access to URIs originating from the particular country of origin. In embodiments, virus identity files may also be used by the scanning facility for scanning the retrieved content. The virus identity files may include definitions and information for identifying malicious code. In an example, the virus identity files may be part of the definitions facility 114.

Figure 3:
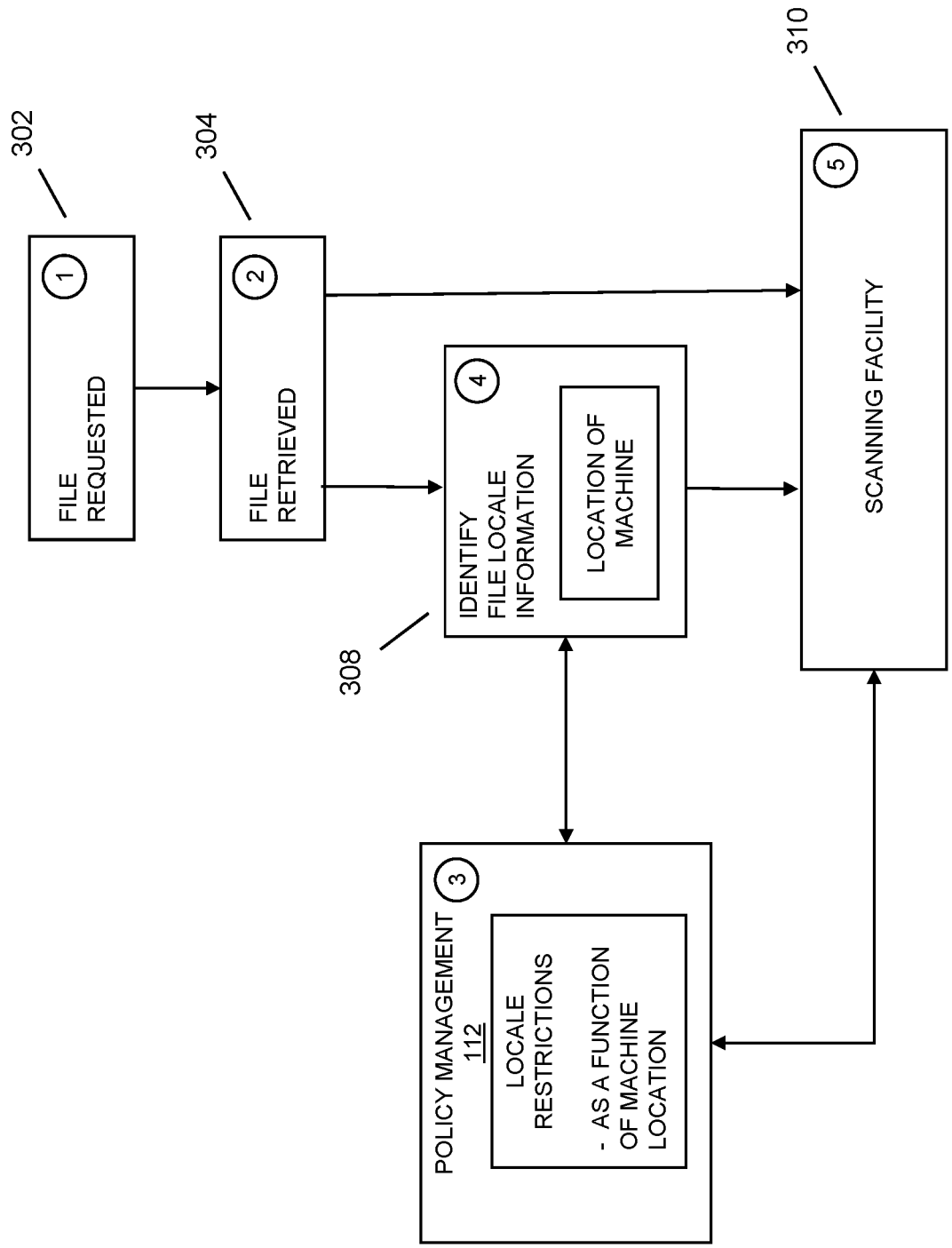
FIG. 3 depicts a flow diagram embodiment for contextual scanning in association with the locale of a requested file.

FIG. 3 depicts a flow diagram embodiment for contextual scanning in association with the locale of a requested file. To describe the flow diagram, reference will be made to FIG. 1, although it is understood that the flow diagram may be implemented in any other suitable environment or system. Further, the process flow embodiment is only an example and must not be taken in limiting sense.

At step one 302 of the flow diagram, a client in the client facility 144 may request access to a computing file. In an embodiment, a client in the client facility 144 may request any other client for a file. The client having the requested file may be a machine or a computer system. For example, a client "A" may request a client "B" for the file, and both the client "A" and client "B" may be a part of the enterprise facility 102. In another example, client "A" may be a part of the enterprise facility 102 and the client "B" may be a part of an external network.

In embodiments, the request for the file may be routed through the network server facility 142. The network server facility 142 may include appliances like routers, gateways, hubs, and the like, which can be utilized to service the client request for the file.

At step two 304 of the flow diagram, the requested file is retrieved. In an example a gateway may be used by the network server facility 142 to retrieve the requested file. Thereafter, at step three, the restrictions in the policy management facility 112 are reviewed in relation to the client request. In an example, the restrictions in the policy management facility 112 may include locale restrictions. The locale restrictions may specify restrictions with respect to the location of the machine or the computer system having the requested file.

At step four 308 of the flow diagram, the locale information of the source machine is identified. In an embodiment, locale information may be part of contextual information associated with the requested file. In an embodiment, the administration facility 134 may extract the locale information of the source machine having the requested file. The locale information may include an IP address of the machine having the requested file. In an example, the locale information may include a network address of the network having the machine storing the requested file. Thereafter, the identified locale information is fed to the policy management facility 112.

At step five 310, the requested file and the list of locale restrictions from the policy management facility 112 are provided as input to a scanning facility. The scanning facility also has access to the locale information of the requested file that has been identified earlier. In an embodiment, the scanning facility may be an Anti-Virus (AV) Engine. The scanning facility may utilize the locale restriction information and the contextual information related to the locale of the source machine to decide whether to block access to the requested file.

Figure 4:
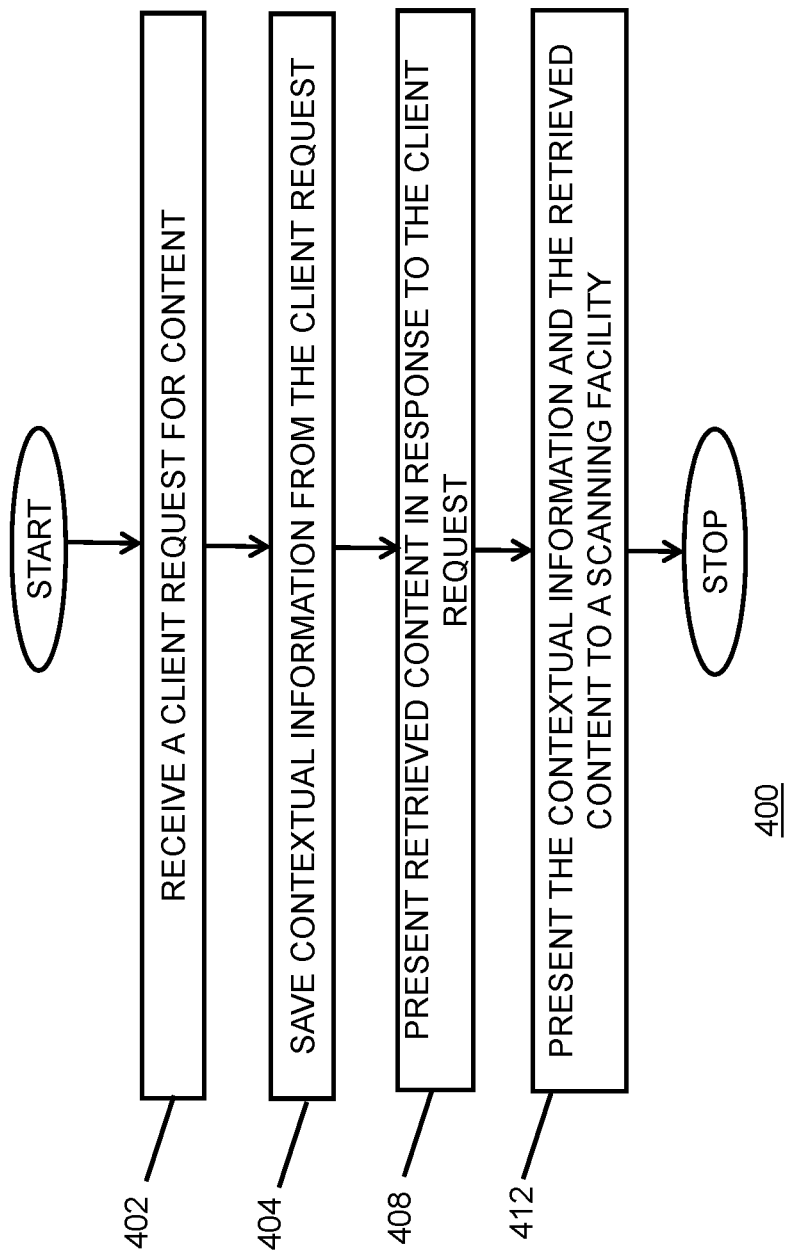
FIG. 4 depicts a flow diagram embodiment for detecting restricted content by analyzing contextual information and retrieved content associated with the requested content.

FIG. 4 depicts a flow diagram embodiment for detecting restricted content by analyzing contextual information and retrieved content associated with the requested content. To describe the flow diagram, reference will be made to FIG. 1, although it is understood that the flow diagram may be implemented in any other suitable environment or system. Further, the process flow embodiment is only an example and must not be taken in limiting sense.

At step 402, a client request for content is received. In embodiments, the client request for content is presented to the network server facility in the enterprise facility 102. The network server facility 142 may include an application server facility, a web server facility, a service provider's mail server facility and the like, for providing the client with access to the requested content. In an example, the client may be a web browser client facility 144 connecting to the web server facility 142 for requesting access to a website. In another example, the client may be an e-mail client facility 144 connecting to a service provider's mail storage server facility 142 through the internet 154 to request access to an email.

In embodiments, the requested content may be requested by a client in the client facility 144. The requested content may include a computing resource. Examples of the computing resource may be a computing application like a software file, an instant messaging service, a peer-to-peer file-sharing service, a VOIP service, a VPN service and the like. Examples of the computing resource may also be a network resource like an external network/location or it may be an external computer device. Another example of the computing resource requested by a client may be a request for a URI.

In embodiments, the content requested by the client may be associated with at least one of multiple IP addresses. For example, the client may request for content from a machine in a network, where the network includes multiple machines and each machine is represented by an IP address.

In embodiments, the content requested by the client may be associated with at least one of multiple servers. In an example, the server may be an enterprise server. For example, the client request for content is provided to at least one of an application server facility, a web server facility, a service provider's mail server facility and the like in the network server facility 142. In another example, the enterprise server may be under the control of an administrator. In yet another example, the server may be a root name server. The root name server may be a DNS server that answers requests for a root domain and routes requests to other name servers.

In embodiments, the content requested by the client may be an address. Examples of the address may be a web address, an origin address, a destination address, an email address, a network address, an address associated with a device ID, an address associated with a digital certificate and the like. In an example, the address associated with a device ID may be a Media Access Control (MAC) address or Ethernet Address for a network adapter in a computer network.

In embodiments, the content requested by the client may be a URI. An example of the URI may be a uniform resource identifier (URI). In an embodiment, the URI may include a domain name. A domain name is a component of a URI that identifies a computer on the Internet. For example, the domain name www.abcd.com in the URI http://www.abcd.com identifies the web address of an organization "abcd" on the internet that can be accessed through the HTTP protocol. In embodiments, the domain name may be a registered domain name, a top-level domain name and the like. A registered domain name is a name that a domain name registrar provides to a customer. For example, in the URI http://www.abcd.com, the registered domain name abcd.com may be provided to an organization "abcd". A top-level domain name is the last part of the domain name i.e. the characters following the dot in any domain name. For example, in the URI http://www.abcd.com, the letters com is the top-level domain name. In an example, the top-level domain name may be associated with a country. For example, the domain name http://www.abcd.uk may be the web address of the organization "abcd" in the United Kingdom (UK). In other embodiments, the domain name may be associated with a voice over Internet protocol (VoIP) service, domain keys, an email and the like.

In embodiments, if the content requested by the client is a URI, the URI may include a sub-domain name. A sub-domain is a domain that is part of the domain name. For example, the sub-domain en.abcd.com may be a sub-domain of the URI http://abcd.com that specifies the website of the organization "abcd" in English language. Similarly, the sub-domain fr.abcd.com may specify the French language website of the organization "abcd". In this embodiment, the sub-domain may be associated with a server.

In other embodiments, the URI may be associated with multiple domain names or with URI redirection. Multiple domain names may be used by an organization for multiple identities. For example, an organization "abcd" manufacturing electric motors may use two domain names "acmotors.abcd.com" and "dcmotors.abcd.com" both directing users to the common website http://abcd.com listing the products under the categories "motors". URI redirection is used by organizations for registering multiple URIs for the same webpage in order to get unrestricted access to users. For example, an organization "http://abcd.com" may also register the URIs "http://abcdf.com" or http://abcds.com" so that an improperly typed URI name by a user may direct the user to the organization's web page. In an embodiment, the URI may include a host name.

In embodiments, the content requested by the client may be a location. In an example, a URI requested by a client may specify a location. Examples of the location may be a geographic location, a business location, a residence location, a government location, a public location, a private location, a network location, a server location, a district, a region, a vicinity and the like. For example the URI http://abcd.uk may specify the webpage of the organization in United Kingdom (UK).

At step 404, contextual information related to the client request is saved. Contextual information may be defined as data that indicates source of the requested content. The data may be considered contextual in that it may be information that accompanies, proceeds, follows, is embedded, and the like, in the data that is requested. In an embodiment, the contextual information may be stored in the policy management facility 112. In an example, the administration facility 134 may extract the contextual information from the requested content and store it in the policy management facility 112. In embodiments, the contextual information may be used for scanning content requested by the client in order to block or provide remedial action for restricted content.

In embodiments, contextual information associated with the content requested by the client may contain patterns that may be utilized during scanning for the identification of target content to be blocked. The pattern may be a static pattern, a changing pattern, an unchanging pattern, a sequence that has been previously stored as a part of policy management 112, a pattern recognized by an identity file that is part of the scanning facility, and the like. For example, the contextual information may be an unchanging portion of a received address or data, where the changing portion is the portion providing unique information to avoid blacklisting. Further, the pattern may be realized across a sequence of addresses, such as breaking the delivery of content into a series of sub-deliverables, each with their own address. For instance, malware may be configured for delivery to a client machine with a unique sequence of addresses, such as www.badaaa.com, www.badbbb.com, www.badccc.com, and the like. These addresses may never have been used before, and therefore may not be included on any blacklist. Upon reception of the first address in the series, some characteristic may be recognized, such as an unusual embedded sequence, a recognized embedded sequence, and the like.

In embodiments, the contextual information may be associated with a character string within the client request. Examples of the character may be an alphanumeric character, an alphanumeric code character, an ascii character and the like. For example, for a URI http://en.abcd.com_requested by the client has the character string "en.abcd.com" in the URI address. This string "en.abcd.com" may be identified as contextual information and may be used later in scanning for malware.

In embodiments, the contextual information may be associated with a portion of a character string within a plurality of client requests. In this embodiment, the plurality of client requests may be in a sequence. In this embodiment, the portion of the character string is changing from a first client request to a second client request. The changing may be a changing numerical sequence, a changing of an alphanumeric sequence, a changing of an alphanumeric code sequence, a changing that increases the value of the portion of the character string, a changing that decreases the value of the portion of the character string, a changing that may be associated with a pattern of changing. In an example, successive client requests for downloading a particular file through the Internet 154 may involve access to the following URIs having a changing character string sequence: http://aaacnt (dot) info, http://bbbcnt (dot) info, http://ccccnt (dot) info, http://dddcnt (dot) info, http://eeecnt (dot) info, http://fffcnt (dot) info, http://gggcnt (dot) info. In this example, "cnt(dot) info" may be the portion of the character string that may be considered as contextual information, since it remains the same for all the client requests.

In embodiments, the contextual information may be associated with a portion of a character string within a plurality of client requests, where the portion of the character string is an unchanged portion from a first client request to a second client request. In this embodiment, the unchanged portion may be associated with malware detection. For example, the content received from the URI "http://en.abcd.com" and the URI http://en.abcd.uk have the unchanged portion "en" that might be associated with malware being downloaded from both the websites.

In embodiments, the contextual information may be associated with a portion of a character string within a plurality of client requests, where the portion of the character string is compared to a library of previously stored portions. The previously stored portions may be an unchanged portion or a changing portion. In an example, the policy management facility 112 may store a list of portions identified as "malware carrying". The portions of a character string identified as contextual information may be compared with the list of portions for malware detection.

In embodiments, the contextual information may be associated with a portion of a character string within a plurality of client requests, where the portion of the character string is associated with the path taken by the client request. An example of a path may include sub-directories in a complete URI name. For example, in the URI http://universityname/department/electrical.edu, the portion "/department/electrical.edu" may signify the path to the website of the electrical engineering department. The path may be a relative path, an absolute path and the like. In an example a URI requested by the client may be http://<domain_name>(dot)<whatever>/dl/nnn/win32.exe. In this example, nnn which may be a 1→3 digit number is the path that may be the contextual information used for scanning for restricted content.

In embodiments, the contextual information may be associated with a portion of a character string within a plurality of client requests, where the portion of the character string is associated with the domain of the client request. In this embodiment, the portion of the character string may change while the domain name stays unchanged. In an example, the portion of the character string may be associated with the path.

In embodiments, the contextual information may be associated with a download. For example, the client may request a file download from the URI http://abcd.com. The downloaded file may be identified as contextual information i.e. it may be used in scanning for malware. In another embodiment, the contextual information may be associated with a detected pattern in a sequence of URI requests.

In embodiments, the contextual information may be associated with path information of the client request. The path information may include at least one of a plurality of sub-path portions from the origin of the client request to the location of the retrieved content. In another embodiment, the contextual information may be associated with path information of the retrieved content. The path information may include at least one of a plurality of sub-path portions from the location of the retrieved content to the origin of the client request.

In embodiments, the contextual information may be associated with information received along with the retrieved content. The information may be header information, path information, location information, domain information, IP address information, network information and the like. For example, when the URI "http://abcd.com" is accessed, the header and network information related to the website content may be considered as contextual information. In another example, the IP address of the computer hosting the URI is received along with the URI content and may be identified as contextual information.

At step 408, retrieved content in response to the client request is presented. In an example, the retrieved content is presented to the threat management facility 100. In this example, the retrieved content may be provided to a scanning facility which may be part of the threat management facility 100.

In embodiments, the retrieved content may be web content. For example, the retrieved content may be content requested by the client on the World Wide Web. The web content may be text content. In an embodiment, the text content may be a document, a data file and the like. For example, the text file may be a Microsoft Word file or a PowerPoint file. In embodiment, the web content may be visual content. The visual content may be an image, a video, an animation file and the like. In other embodiments, the web content may be an aural content, an application, an e-service, a web page, a blog, a search result, a discussion board, an e-commerce site, a social network site, a download, a game, an email, and an appropriate website, an inappropriate website and the like.

In embodiments, the retrieved content may be associated with malware. The retrieved content may include malware that may be associated with spam, a virus, a worm, a Trojan horse, spyware, adware and the like.

In embodiments, the retrieved content may be confidential content. In an example, the confidential content may be confidential to a company. For example content retrieved from the website http://www.abcd.com might contain confidential information of the company "abcd". In another example, the confidential content may be confidential to a government of to a country.

In embodiments, the retrieved content may be offensive content. In examples, the offensive content may be personally offensive, professionally offensive, sexually offensive and the like.

In embodiments, a client request restriction in association with a policy facility may be provided. In embodiments, the policy management facility 112 stores a list of client request restrictions. The restrictions are used in identifying content that may be blocked by a scanning facility. The restrictions may be known as restricted content.

In embodiments, the client request restriction is associated with the contextual information from the client request. In an embodiment, the contextual information includes an alphanumeric pattern associated with malware. In an example, the client request restriction may be restriction associated with accessing a URI having a string portion "en.abcd". The string portion might be a virus associated with the parent domain "http//www.en.abcd.com". In an embodiment, the alphanumeric pattern may be a known alphanumeric string within the client request. In another example, the pattern may be a sequence of alphanumeric strings in a series of client requests. For example, malware may be configured for delivery to a client machine with a unique sequence of addresses, such as www.badaaa.com, www.badbbb.com, www.badccc.com, and the like. In another embodiment, the contextual information includes a domain name pattern associated with malware. The domain name pattern may be associated with a series of client requests. For example, domain names not ending in ".com" or ".co.uk" might be in the list of client request restrictions. Examples of such domain names may be http://<domain_name>(dot) ru, http://<domain_name>(dot) cn, whatever>http://<domain_name>(dot) biz. These domain names may be domains having a history of hosting malware.

In embodiments, the client request restriction may be associated with a characteristic of the retrieved content. In an example, for a client URI request, the characteristic of the URI domain may be a client request restriction. Examples of the domain characteristics may be age of the domain, familiarity of the domain to the client facility 144, registration of the domain in a specific country, registration by specific registrants and the like. In an embodiment, the characteristic may be associated with an email message characteristic. The email message characteristic may be associated with an email header, a mailing list and the like. For example, emails from the mailing list "groups.yahoo.listofcompanies.com" might be restricted. In another embodiment, the characteristic may be a language characteristic. The language characteristic may be associated with a phrase. In an example, the phrase may be a slang. In another embodiment, the language characteristic may be associated with at least one of words and phrases in proximity to one another.

In embodiments, the client request restriction is associated with a type of retrieved content. In examples, the type may be a webpage, a document, a multimedia file and the like. The multimedia file may be a video file, an audio file, an animation file, an advertisement and the like. In other examples, the type may be an attachment, a download, an email and the like.

In embodiments, the client request restriction may be associated with the source of the content. In examples, the source of the content may be the source of the downloaded content. For example, the source of the content may be the "name of the author" of a downloaded file. In other examples, the source of the content may be a local machine. For example, the source of the content may be a computer having an IP address "abcd.gyth.dfsr.xxxx" from which the content is downloaded in the network. In this example, the local machine may have created the content or may have copied the content. In embodiments, the source of the content may from outside an enterprise, for example, from outside the enterprise 102. In this example, the source of the content may be a router or a hub connected to the enterprise 102 through the Internet 154. In other embodiments, the source of the content may from inside the enterprise 102.

At step 412, the contextual information and the retrieved content is provided to a scanning facility. The scanning facility might be a part of the threat management facility 100. In an example, the scanning facility may be an Anti-Virus (AV) engine. The scanning facility utilizes the contextual information provided at step 404 and the retrieved content provided at step 408 to detect restricted content. The restricted content may be the list of restrictions in the policy management facility. In an example, the scanning facility may use the client request restrictions stored in the policy management facility 144 to detect restricted content. In an example, to detect malware associated with a requested URI, the scanning facility may provide the URI to a Virtual Data Language (VDL) file. The VDL file may examine the retrieved content and provide results to the scanning facility. In an example, malware running on a client is attempting to perform a HTTP download of a file from the URI http://www.abcd.com through a gateway in the enterprise facility 102. The scanning engine uses the contextual information associated with this download to scan the download for malware. The contextual information may be the IP address of the machine hosting the file. In case, this IP address is listed as "restricted due to presence of malware in the restrictions in the policy facility 112, the scanning facility is able to detect the presence of malware.

In embodiments, the contextual information may be extracted from a URI included in the client request, where the extracted information may be a plurality of characters from the URI, may exclude the domain name, may include address information irrespective of the domain name, may be a data pattern determined based on a study of how a malicious attacker is changing the URI, and the like. In embodiments, the contextual information may be derived from a URI included in the client request, where data pattern information may be extracted from the URI and compared to data patterns of target content to derive the contextual information. In embodiments, the scanning facility may be a local to the client, a server based scanning facility, and the like. A client request restriction process may be provided in association with a policy facility such that certain client requests are automatically denied. In addition, a remedial action may be performed on the client in response to the scanning facility blocking of restricted content, where the remedial action may be a scan of a local drive for malicious software.

In embodiments, the scanning facility may also suggest remedial action to the client in the client facility 144 based on the detection of restricted content. The remedial action may be performed by the remedial action facility 128 in the threat management facility 100. In an embodiment, the scanning facility may block the access of a restricted URI to the client. For example, a gateway in the scanning facility may block access of the URI to the client. In another embodiment, the scanning facility may send a data file to the requesting client with a notification message. For example, a gateway in the scanning facility may send a data file to the requesting client with a notification message. The notification message may include an action to be performed by the client. The notification message may direct the client to parse data in the message and decide an appropriate action. In an embodiment, the data from the data file may be written to the client machine but the data file may be non-executable, thus avoiding any undesirable effect on the client machine. In another embodiment, an identity will be triggered in the virus database. Depending on the notification message, the client may obey an action dictated in the notification message. For example, the notification message may direct the client to delete the received file. In another example, the client may parse data in the notification message and decide appropriate action on the data file. An example of the appropriate action may be doing a special scan on the received file before opening the file and removing adware in the file using software. Another example of the appropriate action taken by the client may be triggering a query process to determine the malicious process responsible for sourcing the requested content. Following the query process, the client may identify the malicious process, may contain the process by blocking the process. In an example, the process may be blocked at a gateway in the enterprise facility 102. In another example, the client may be isolated from the network which is the source of the malicious process. In yet another example, the client in the client facility 144 may scan the retrieved content by itself to check for stealthing files, processes, or Registry Keys.

Figure 5:
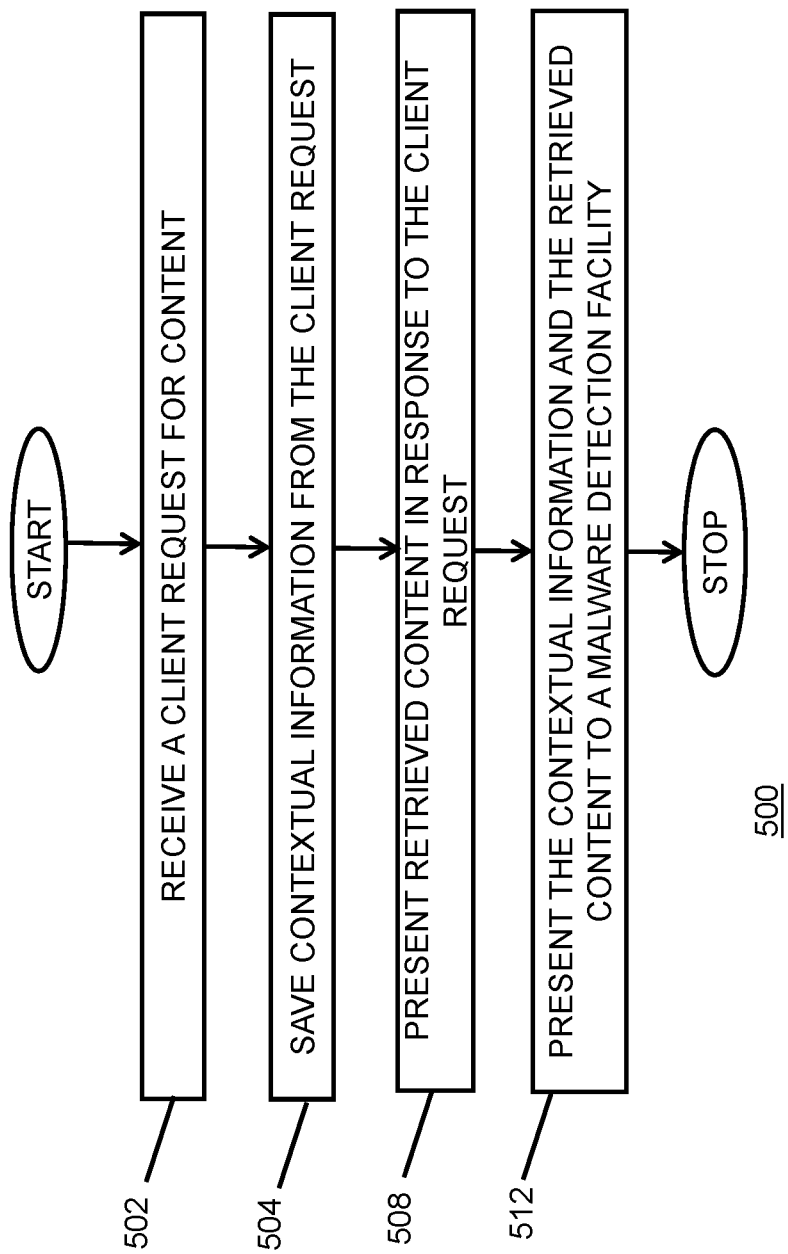
FIG. 5 depicts a flow diagram embodiment for detecting malware by analyzing contextual information and retrieved content associated with the requested content.

FIG. 5 depicts a flow diagram embodiment 500 for detecting malware by analyzing contextual information and retrieved content associated with the requested content. In embodiments, a client request for content may be received 502, where contextual information from the client request may be saved 504. In embodiments, when the content is retrieved 508, it may be presented, along with the associated contextual information, to a malware detection facility 512. In embodiments, the malware detection facility may be associated with the threat management facility 100.

Figure 6:
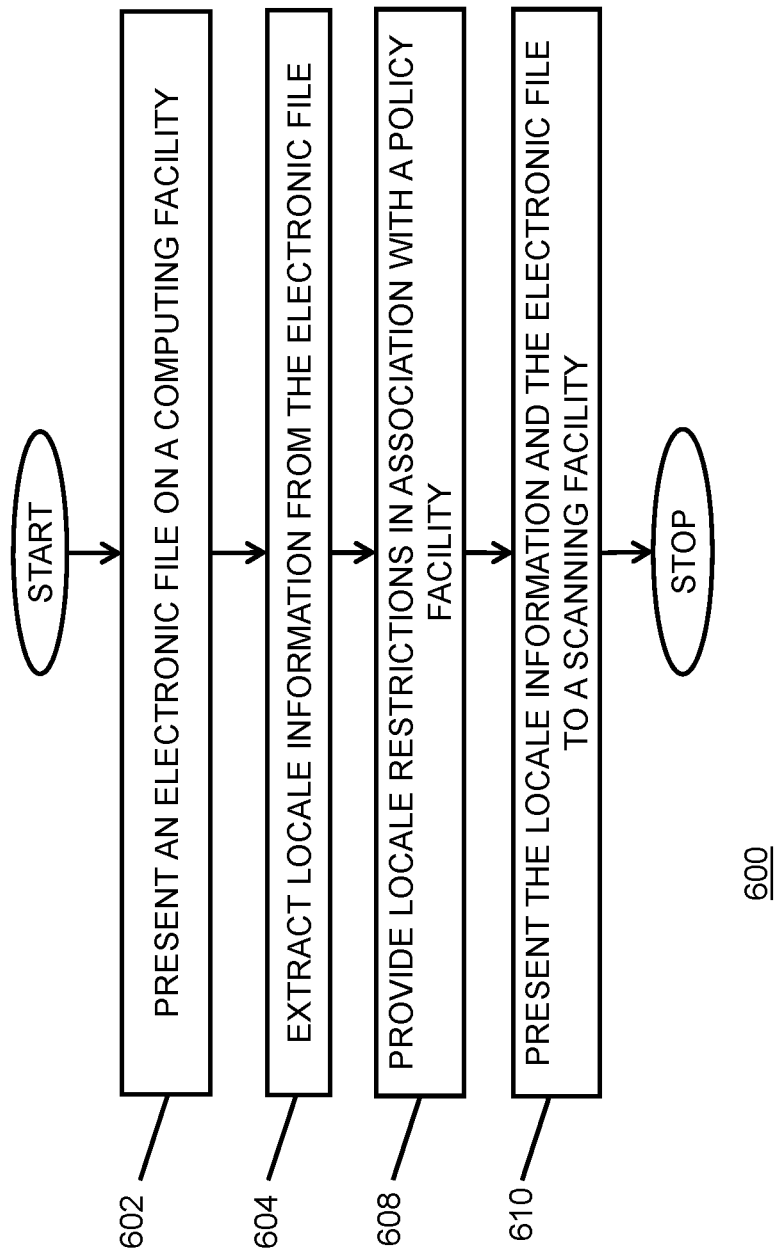
FIG. 6 depicts a flow diagram embodiment for detecting restricted content associated with an electronic file.

FIG. 6 depicts a flow diagram embodiment 600 for detecting restricted content associated with an electronic file. To describe the flow diagram, reference will be made to FIG. 1, although it is understood that the flow diagram may be implemented in any other suitable environment or system. Further, the process flow embodiment is only an example and must not be taken in limiting sense.

At step 602 of the flow diagram, an electronic file is presented on a computing facility. The electronic file may be presented to a client based on a client request for a file. In an embodiment, a client in the client facility 144 may request any other client for a file. The client having the requested file may be a machine or a computer system. For example, a client "A" may request a client "B" for the file, and both the client "A" and client "B" may be a part of the enterprise facility 102. In another example, client "A" may be a part of the enterprise facility 102 and the client "B" may be a part of an external network.

In embodiments, the request for the file may be routed through the network server facility 142. The network server facility 142 may include appliances like routers, gateways, hubs that can be utilized to service the client request for the file. In an example a gateway may be used by the network server facility 142 to retrieve the requested file. In an example, the gateway may be part of the enterprise facility 102. In another example, the gateway may be external to the enterprise facility 102.

In embodiments, the electronic file may be retrieved from a file system. In other embodiments, the electronic file may be retrieved from a network. In an example, the file may be downloaded from a network. The network may be part of the enterprise facility 102 or external to it. Examples of electronic file may be a word processing document, a spread sheet document, an image file, an audio file, a music file, an email, an application file, an executable file, a web page, a web content page, a database file, a source code file, an operating system file and the like.

At step 604 locale information associated with the file is extracted. In an embodiment, locale information may be part of contextual information associated with the requested file. In an embodiment, the administration facility 134 may extract the locale information of the requested file. The locale information may include IP address of the machine having the requested file. In an example, the locale information may include network address of the network having the machine storing the requested file. In an example, the identified locale information is fed to the policy management facility 112.

In embodiments, locale information may be associated with a location of the file. Examples of location may be a geographic location, a business location, residence location, a government location, a public location, a private location, a network location, a server location, a district, a region, a vicinity and the like.

In embodiments, the locale information is associated with a domain name, a path, a file name and the like. In other embodiments, the locale information may be associated with file header information, a current location, a previous location, a user location and the like.

At step 608, locale restrictions associated with the policy management facility 112 are provided. The policy management facility 112 may have a list of locale restrictions that may be used by a scanning facility to restrict access to restricted content. The locale restrictions may be associated with the location of the computing facility. In an example, the locale restrictions may be associated with the location of the gateway in the enterprise facility 102 through which the file request is routed. In another example, the locale information may be associated with the location of the client in the client facility 144.

In embodiments, the list of restrictions may include restricted content associated with application classification. Examples of application classification may be malware, work product, personal, unapproved, restricted, allowed and the like.

In embodiments, the restricted content may be confidential content. For example, the confidential content may be company confidential or government confidential.

In embodiments, the restricted content may be offensive content. Examples of offensive content may include content that is personally offensive, professionally offensive, sexually offensive, and the like.

At step 610, the locale information and the electronic file is presented to a scanning facility. The scanning facility may be a part of the threat management facility 100. The scanning facility utilizes the locale information and the locale restrictions in the policy management facility 112 to help in the detection of restricted content associated with the file.

In embodiments, the locale information is used by the scanning facility to determine reputation of the content. In examples, reputation of the content may be associated with source of the content, author of the content and the like. In examples, the author of the content may be associated with an enterprise, may be associated with the location and the like.

In embodiments, reputation of the content may be associated with time. Association of the reputation of the content with time includes time the content is created, the time the content is downloaded, the time the content is copied, the time the content is requested and the like.

In embodiments, the scanning facility may block access to a file originating from the URI "http//www.badlocation.org" if in the list of locale restrictions the URI "http//www.badlocation.org" is listed as containing a Trojan horse.

In embodiments, the scanning facility may provide for remedial action to the client in the client facility 144 based on the detection of restricted content. The remedial action may be triggered by the remedial action facility 128 in the threat management facility 100. For example, a gateway in the scanning facility may send a data file to the requesting client with a notification message. The notification message may include an action to be performed by the client. The notification message may direct the client to parse data in the message and decide an appropriate action. In an embodiment, the data from the data file may be written to the client machine but the datafile may be non-executable, thus avoiding any undesirable effect on the client machine. In another embodiment, an identity will be triggered in the virus database. Depending on the notification message, the client may obey an action dictated in the notification message. For example, the notification message may direct the client to delete the received file. In another example, the client may parse data in the notification message and decide appropriate action on the data file. An example of the appropriate may be doing a special scan on the received file before opening the file and removing adware in the file using software. An example of the appropriate action may be doing a special scan on the received file before opening the file and removing adware in the file using software. Another example of the appropriate action taken by the client may be triggering a query process to determine the malicious process responsible for sourcing the requested content. Following the query process, the client may identify the malicious process, may contain the process by blocking the process. In an example, the process may be blocked at a gateway in the enterprise facility 102. In another example, the client may be isolated from the network which is the source of the malicious process. In yet another example, the client in the client facility 144 may scan the retrieved content by itself to check for stealthing files, processes, or Registry Keys.

Figure 7:
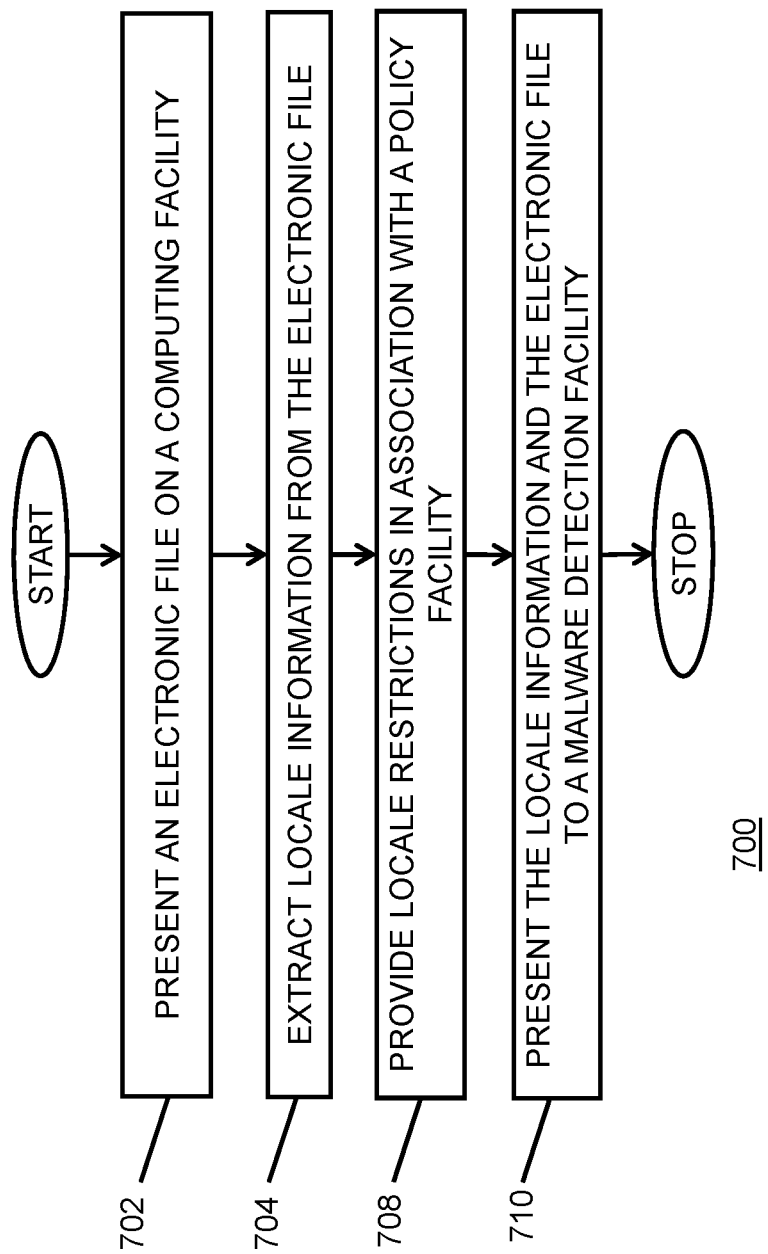
FIG. 7 depicts a flow diagram embodiment for detecting malware associated with an electronic file.

FIG. 7 depicts a flow diagram embodiment 700 for detecting malware associated with an electronic file. In embodiments, an electronic file may be presented on a computing facility 702, where locale information may be extracted from the electronic file 704. In addition, there may be locale restrictions provided in association with a policy facility 708. The locale information and the electronic file may then be presented to a malware detection facility 710. In embodiments, the policy facility 112 and/or the malware detection facility may be associated with the threat management facility 100.

Contextual information associated with a client request for content, locale information associated with the client request, locale information associated with the retrieved content, and the like, may be presented to a scanning facility along with the content. In embodiments, the synergy associated the presentation of content along with this information may provide a benefit in the scanning process that better enables the scanning facility to detect target content. In embodiments, as a result, the target content may be blocked, such as in the case of unwanted content, malicious content, illegal content, confidential content, and the like.

The elements depicted in flow charts and block diagrams throughout the figures imply logical boundaries between the elements. However, according to software or hardware engineering practices, the depicted elements and the functions thereof may be implemented as parts of a monolithic software structure, as standalone software modules, or as modules that employ external routines, code, services, and so forth, or any combination of these, and all such implementations are within the scope of the present disclosure. Thus, while the foregoing drawings and description set forth functional aspects of the disclosed systems, no particular arrangement of software for implementing these functional aspects should be inferred from these descriptions unless explicitly stated or otherwise clear from the context.

Similarly, it will be appreciated that the various steps identified and described above may be varied, and that the order of steps may be adapted to particular applications of the techniques disclosed herein. All such variations and modifications are intended to fall within the scope of this disclosure. As such, the depiction and/or description of an order for various steps should not be understood to require a particular order of execution for those steps, unless required by a particular application, or explicitly stated or otherwise clear from the context.

The methods or processes described above, and steps thereof, may be realized in hardware, software, or any combination of these suitable for a particular application. The hardware may include a general-purpose computer and/or dedicated computing device. The processes may be realized in one or more microprocessors, microcontrollers, embedded microcontrollers, programmable digital signal processors or other programmable device, along with internal and/or external memory. The processes may also, or instead, be embodied in an application specific integrated circuit, a programmable gate array, programmable array logic, or any other device or combination of devices that may be configured to process electronic signals. It will further be appreciated that one or more of the processes may be realized as computer executable code created using a structured programming language such as C, an object oriented programming language such as C++, or any other high-level or low-level programming language (including assembly languages, hardware description languages, and database programming languages and technologies) that may be stored, compiled or interpreted to run on one of the above devices, as well as heterogeneous combinations of processors, processor architectures, or combinations of different hardware and software.

Thus, in one aspect, each method described above and combinations thereof may be embodied in computer executable code that, when executing on one or more computing devices, performs the steps thereof. In another aspect, the methods may be embodied in systems that perform the steps thereof, and may be distributed across devices in a number of ways, or all of the functionality may be integrated into a dedicated, standalone device or other hardware. In another aspect, means for performing the steps associated with the processes described above may include any of the hardware and/or software described above. All such permutations and combinations are intended to fall within the scope of the present disclosure.

While the invention has been disclosed in connection with the preferred embodiments shown and described in detail, various modifications and improvements thereon will become readily apparent to those skilled in the art. Accordingly, the spirit and scope of the present invention is not to be limited by the foregoing examples, but is to be understood in the broadest sense allowable by law.

All documents referenced herein are hereby incorporated by reference.

What is claimed is:

1. A method for using a scanning facility executing on processing circuitry, the method comprising:
   receiving a request for a file from a client at the scanning facility, the request including an outbound network request from the client to a network location for the file specified by a Uniform Resource Identifier (URI) including a domain for the URI;
   saving contextual information from the request at the scanning facility, wherein the contextual information includes first locale information specifying a first location associated with the domain for the URI;
   examining the request for compliance with a management policy at the scanning facility;
   in response to the request retrieving the file from the network location and transmitting the file to the scanning facility;
   at a computer presented with the file, extracting second locale information from the file, the second locale information indicating a source of the file, the source including at least one of a geographic location, a business location, a residence location, an author, and a machine;
   presenting the second locale information and the file to the scanning facility; and
   analyzing, with the scanning facility, the first locale information specifying the first location associated with the domain for the URI from the request comparatively with the second locale information extracted from the file and indicating the source of the file to detect whether the file includes restricted content based on one or more locale restrictions of the management policy.

2. The method of claim 1, wherein the contextual information further includes one or more of a known alphanumeric string within the request from the client and a sequence of alphanumeric strings in a series of client requests.

3. The method of claim 1, wherein access to the URI directs a user to another web page.

4. The method of claim 1 wherein analyzing includes analyzing header information for the file responsive to the request to detect whether the file includes restricted content from a list of restrictions in the management policy.

5. The method of claim 1, further comprising executing the scanning facility on the client.

6. The method of claim 1, further comprising executing the scanning facility on a remote threat management facility.

7. The method of claim 1, further comprising, when the file includes restricted content, blocking the restricted content from the client.

8. The method of claim 1, further comprising, when the file includes restricted content, performing a remedial action on the client in response to the restricted content.

9. The method of claim 1, wherein contextual information includes path information in the request.

10. The method of claim 1, wherein the contextual information includes a registered domain name for an organization.

11. The method of claim 1, wherein the contextual information includes header information in the request.

12. The method of claim 1, wherein the contextual information includes data indicating a source of the request.

13. The method of claim 1, wherein the contextual information includes header information for the file retrieved in response to the request.

14. The method of claim 1, wherein the second local information indicates a reputation of content of the file.

15. A computer program product comprising computer executable code embodied in a non-transitory computer readable medium that, when executing on one or more computing devices associated with a scanning, performs the steps of:
receiving a request for a file from a client at a scanning facility, the request including an outbound network request from the client to a network location for the file specified by a Uniform Resource Identifier (URI) including a domain for the URI;
saving contextual information from the request at the scanning facility, wherein the contextual information includes first locale information specifying a first location associated with the domain for the URI;
examining the request for compliance with a management policy at the scanning facility;
in response to the request, retrieving the file from the network location and transmitting the file to the scanning facility;
extracting second locale information from the file at a computer presented with the file, the second locale information indicating a source of the file, the source including at least one of a geographic location, a business location, a residence location, an author, and a machine;
presenting the second locale information and the file to the scanning facility; and
analyzing, with the scanning facility, the first locale information specifying the first location associated with the domain of the URI from the request comparatively with the second locale information extracted from the file and indicating the source of the file to detect whether the file includes restricted content based on one or more locale restrictions of the management policy.

16. The computer program product of claim 15, wherein the contextual information further includes one or more of a known alphanumeric string within the request from the client and a sequence of alphanumeric strings in a series of client requests.

17. The computer program product of claim 15, wherein the contextual information further includes a changed portion of the request relative to other requests.

18. The computer program product of claim 17, wherein access to the URI directs a user to another web page.

19. The computer program product of claim 15, wherein analyzing includes analyzing header information for the file responsive to the request to detect whether the file includes restricted content from a list of restrictions in a management policy.

20. A system comprising:
one or more hardware processors;
a non-transitory computer readable medium comprising instructions executable by the one or more hardware processors; and
a scanning facility configured to receive a request for a file from a client, the request including an outbound network request from the client to a network location specified by a Uniform Resource Identifier (URI) including a domain for the URI, the scanning facility further configured to save contextual information from the request including first locale information specifying the first location associated with the domain for the URI, to examine the request for compliance with a management policy at the scanning facility, to retrieve the file responsive to the request, to extract at a computer presented with the file second locale information from the file, the second locale information indicating a source of the file, the source including at least one of a geographic location, a business location, a residence location, an author, and a machine, and to analyze the first locale information specifying the first location associated with the domain of the URI from the request comparatively with the second locale information extracted from the file and indicating the source of the file to detect whether the file includes restricted content based on one or more locale restrictions of the management policy.

* * * * *